US006939008B2

(12) United States Patent
Shibatani et al.

(10) Patent No.: US 6,939,008 B2
(45) Date of Patent: Sep. 6, 2005

(54) PROJECTION TYPE DISPLAY DEVICE

(75) Inventors: Takashi Shibatani, Kashihara (JP); Hiroshi Hamada, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 142 days.

(21) Appl. No.: 10/100,064

(22) Filed: Mar. 19, 2002

(65) Prior Publication Data

US 2002/0131022 A1 Sep. 19, 2002

(30) Foreign Application Priority Data

Mar. 19, 2001 (JP) ........................................ 2001-079249
Jan. 31, 2002 (JP) ........................................ 2002-023101

(51) Int. Cl.[7] .......................... G03B 21/00; G03B 21/20; G02F 1/1335
(52) U.S. Cl. ........................... 353/31; 353/32; 353/102; 349/95; 349/7
(58) Field of Search ............................ 353/102, 30–34, 353/84, 122; 349/62, 95, 7, 5, 9, 10

(56) References Cited

U.S. PATENT DOCUMENTS

| | | | |
|---|---|---|---|
| 5,161,042 A | 11/1992 | Hamada | 359/41 |
| 5,581,379 A * | 12/1996 | Aoyama et al. | 349/5 |
| 5,633,737 A | 5/1997 | Tanaka et al. | 349/95 |
| 5,680,186 A | 10/1997 | Watanabe et al. | 349/95 |
| 5,726,719 A | 3/1998 | Tanaka et al. | 349/8 |
| 5,737,040 A | 4/1998 | Ichikawa et al. | 349/9 |
| 5,760,850 A * | 6/1998 | Nakanishi et al. | 349/5 |
| 5,777,804 A * | 7/1998 | Nakamura et al. | 359/727 |
| 5,969,832 A * | 10/1999 | Nakanishi et al. | 359/15 |
| 6,144,426 A * | 11/2000 | Yamazaki et al. | 349/95 |
| 6,163,349 A * | 12/2000 | Nakanishi et al. | 349/5 |
| 6,332,684 B1 * | 12/2001 | Shibatani et al. | 353/31 |
| 6,464,359 B1 * | 10/2002 | Owen et al. | 353/31 |
| 6,547,398 B2 * | 4/2003 | Cho et al. | 353/31 |
| 6,665,100 B1 * | 12/2003 | Klug et al. | 359/23 |
| 6,819,366 B2 * | 11/2004 | Suzuki et al. | 349/9 |

FOREIGN PATENT DOCUMENTS

| | | |
|---|---|---|
| JP | 55-135808 A | 10/1980 |
| JP | 59-230383 A | 12/1984 |
| JP | 61-64158 A | 4/1986 |

OTHER PUBLICATIONS

Oikawa et al, "Distributed–Index Planar Microlens Array Prepared from Deep Electromigration", *Electronic Letters*, vol. 17, No. 13, Jun. 25, 1981, pp. 452–454.

Popovic et al, "Technique for Monolithic Fabrication of Microlens Array", *Applied Optics*, vol. 27, No. 7, Apr. 1, 1988, pp. 1281–1284.

* cited by examiner

*Primary Examiner*—Judy Nguyen
*Assistant Examiner*—Andrew Sever
(74) *Attorney, Agent, or Firm*—Nixon & Vanderhye P.C.

(57) ABSTRACT

A projection type display device includes: a light source for emitting light including multiple light components falling within different wavelength ranges; pixels for modulating the light independently; a first optical system, which receives the light from the light source and directs it toward the pixels; and a second optical system, which projects the light, modulated by the pixels, onto a projection plane. The first optical system includes an optical element for converging the light components onto mutually different ones of the pixels in accordance with their wavelength ranges. The pixels are arranged in a predetermined azimuth on a panel plane where the pixels are defined. The element has a first length in a first direction defined by the azimuth and a second length, greater than the first length, in a second direction substantially perpendicular to the first direction. The element converges the light components in the first and second directions.

19 Claims, 16 Drawing Sheets

PROJECTION TYPE DISPLAY DEVICE

BACKGROUND OF THE INVENTION

1. Field of the Invention

The present invention relates to a projection type display device and more particularly relates to a single-panel projection type display device for use to conduct a color display.

2. Description of the Related Art

A projection type color image display device using a liquid crystal display panel has been known in the art. A projection type color liquid crystal display device should be provided with a light source separately because the liquid crystal display panel thereof does not emit any radiation spontaneously. However, a projection type color liquid crystal display device has a number of advantages over a projection type cathode-ray tube (CRT) display device. Specifically, a projection type color liquid crystal display device realizes a broader color reproducible range, is easier to carry due to its smaller size and lighter weight, and does not require any convergence correction because a device of that type is not affected by geomagnetism. Thus, further development of devices of that type is awaited.

Projection type color liquid crystal display devices are classifiable into a three-panel type and a single-panel type according to their methods of displaying an image. Specifically, a projection type color liquid crystal display device of the three-panel type uses three liquid crystal display panels (which will also be referred to as "liquid crystal display elements" herein) that are respectively provided for the three primary colors of light. On the other hand, a projection type color liquid crystal display device of the single-panel type uses just one liquid crystal display panel to display an image. The three-panel projection type liquid crystal display device of the former type includes an optical system and three liquid crystal display panels. The optical system is provided to separate white light, emitted from a light source, into three light beams representing the three primary colors of red, green and blue (which will be herein referred to as "color light beams") and then direct these color light beams toward the three liquid crystal display panels. The three liquid crystal display panels are provided to form an image by independently controlling these color light beams. That is to say, the color light beams are modulated by these three liquid crystal display panels, respectively. By optically superimposing these modulated color light beams one upon another on the screen, an image can be displayed thereon in full colors.

A display device of this three-panel type realizes not only highly efficient use of the light from the light source, but also high color purity for the image displayed. However, the three-panel type needs the optical system for directing the color light beams toward the respective liquid crystal display panels and another optical system for synthesizing together the color light beams that have been modulated by the panels. As also described above, this type requires three liquid crystal display panels. Accordingly, compared to the single-panel type, the three-panel type needs much more complicated optical systems and a far greater number of components. Thus, the three-panel type contributes to cost and size reductions much less than the single-panel type.

In contrast, a projection type liquid crystal display device of the latter single-panel type needs just one liquid crystal display panel and much simpler optical systems, thus contributing to cost reduction advantageously. Accordingly, the single-panel type can be used effectively for a small-sized projection system. Specifically, a known single-panel projection type liquid crystal display device may use a liquid crystal display panel including color filters that have been formed in a mosaic or striped pattern for the three primary colors. The single-panel type gets the incoming light modulated by the liquid crystal display panel, and then projects the modulated light through a projecting optical system onto a screen. A display device of this type is disclosed in Japanese Laid-Open Publication No. 59-230383, for example.

However, the display device of the single-panel type can utilize only about one-third of the incoming light for the display purposes because the light is absorbed into, or reflected from, the color filters unintentionally. That is to say, supposing a light source for emitting light of the same brightness is used for both the single-panel and three-panel types, the brightness of the image formed on the screen by the single-panel type including the color filters decreases to about one-third of that of the image formed thereon by the three-panel type.

To avoid the decrease in brightness of the image on the screen, the light source may have its brightness increased. However, particularly when a display device of the single-panel type is intended to be a household appliance, the brightness of the light source should not be increased. This is because the power dissipation thereof would increase disadvantageously by doing so. Also, where the color filters used absorb light, the energy of the light that has been absorbed into the color filters changes into heat. Accordingly, if the light source were brightened in that case, not only excessive rise in temperature of the liquid crystal display panel but also accelerated fading of the color filters should be inevitable. Thus, to heighten the value of a projection type color image display device of the single-panel type, it is a key problem to be solved how to utilize the light more efficiently without brightening its light source.

To overcome this problem, a single-panel projection type color image display device proposed tries to utilize the incoming white light more efficiently by getting the light separated into multiple color light beams by dichroic mirrors, not color filters. See Japanese Laid-Open Publication No. 4-60538, for example.

As shown in FIG. 14, the projection type color image display device separates white light, which has been emitted from a white light source 101, into three light beams representing red (R), green (G) and blue (B) by using three dichroic mirrors 104R, 104G and 104B, respectively. These dichroic mirrors 104R, 104G and 104B are disposed to define mutually different angles with the direction in which the white light travels. The three light beams representing R, G and B will be herein referred to as "R light beam", "G light beam" and "B light beam", respectively. The R, G and B light beams, into which the white light has been separated by the dichroic mirrors 104R, 104G and 104B, are incident onto a microlens array 105 at mutually different angles. The microlens array 105 is disposed on a surface of a liquid crystal display panel 107.

FIG. 15 illustrates a configuration for the liquid crystal display panel 107 of the projection type color liquid crystal display device shown in FIG. 14. The liquid crystal display panel 107 has a structure in which a liquid crystal layer 107c is sandwiched between a pair of transparent substrates 107a and 107b that faces each other. On the surface of the transparent substrate 107a that is opposed to the liquid crystal layer 107c, a driver including pixel electrodes, thin-film transistors (TFTs) and bus lines, an alignment layer (not shown) and a black matrix (BM) 111 are provided. The BM 111 is formed as an opaque layer for preventing the bus line regions from being exposed to the incoming light beams.

The microlens array 105 is an array of microlenses 106, each having a size corresponding to three pixels of the liquid crystal display panel 107. The light beams in the respective colors that have been incident onto the microlens array 105 at mutually different angles are distributed and irradiated to their associated pixels of the liquid crystal display panel 107 in accordance with their incident angles. In other words, the R, G and B light beams are converged by each of these lenses 106 onto their associated set of three pixels. At the three pixels on which the R, G and B light beams have been converged, the light modulating functions (more specifically, the orientation states) of their associated parts of the liquid crystal layer 107c are controlled independently in accordance with image signals. The light that has been subjected to the desired modulation in this manner is projected onto a screen 110 by way of a field lens 108 and a projection lens 109 that are provided in front of the liquid crystal display panel 107.

This projection type color image display device uses the dichroic mirrors 104R, 104G and 104B and the microlens array 105 to make the light beams in the three primary colors incident onto mutually different pixels, and needs no color filters that absorb light. Accordingly, a display device of this type can utilize the incoming light more efficiently and can display a brighter image.

The liquid crystal display panel 107 is also provided with the black matrix (BM) 111 for the respective pixels so as to prevent the TFTs and bus line regions from being exposed to the incoming light beams. Each pixel has a so-called "pixel opening" 112, which is not covered with the BM 111 and through which the incoming light can pass. The ratio of the size of the pixel opening 112 to the pixel size is normally called an "aperture ratio".

Without the microlens array 105, the incoming light would be incident as parallel light onto the liquid crystal display panel 107. In that case, parts of the incoming light would be cut off f by the BM 111 and could not contribute to the display anymore. As a result, the incoming light could not be utilized so efficiently. In contrast, this projection type color image display device can get the incoming light collected onto the pixel openings 112 by the microlens array 105. Accordingly, a greater quantity of light can pass through the liquid crystal display panel 107 and a brighter image can be projected onto the screen 110.

Suppose three liquid crystal display panels included in the three-panel projection type liquid crystal display device and one liquid crystal display panel included in this single-panel projection type liquid crystal display device each have the same resolution (or the same number of pixels). In that case, the resolution of a full-color image formed on the screen by the three-panel type will be three times as high as that of an image formed thereon by the single-panel type. The reason is as follows. A display device of the three-panel type forms a color image on the screen by synthesizing together the R, G and B light beams that have gone out of the three liquid crystal display panels, respectively. Accordingly, a full-color image, having the same number of pixels as that of the pixels of each liquid crystal display panel, can be displayed on the screen. In the single-panel type on the other hand, one pixel of the liquid crystal display panel is associated with just one of R, G and B. Thus, a full-color image displayed on the screen by the single-panel type has a pixel number just one-third as large as that of the liquid crystal display panel.

FIG. 16 illustrates a situation where a display panel having the same resolution as that of the three display panels of the three-panel type is used for a single-panel projection type liquid crystal display device. Each of the R, G and B pixels has an approximately square planar shape and each microlens 106b has a size corresponding to the total size of the three R, G and B pixels. In this case, each microlens 106b has a horizontally elongated planar shape, of which the horizontal size is three times as long as its vertical size. In FIG. 16, R, G or B does not indicate the color of a color filter provided for its associated pixel but the color of the light beam to be converged on that pixel through its associated microlens.

On the other hand, if a liquid crystal display panel, having three times as large a number of pixels as that of the three display panels of the three-panel type, is provided for the single-panel type, even the single-panel type achieves the resolution of the three-panel type. FIG. 17 illustrates pixels and microlenses in a liquid crystal display panel for a high-resolution, single-panel display device. As shown in FIG. 17, a square picture element (i.e., a minimum unit for displaying a full-color image) is made up of three pixels, through which the R, G and B light beams pass, respectively. Also, multiple R, G and B pixels, each of which has a horizontal size one-third as long as its vertical size, are arranged to form a striped pattern. Each of the condensing microlenses 106a is provided for its associated set of three R, G and B pixels. In this case, each microlens 106a has an approximately square planar shape.

However, if the three R, G and B pixels are provided for one pixel region of the three-panel type as shown in FIG. 17, additional bus line regions are required to control the two extra pixels separately. That is to say, since the number of bus line regions and the number of switching elements such as TFTs for controlling the pixels increase, the production yield of the display device decreases and the fabrication cost thereof increases instead. Thus, to fabricate a liquid crystal display panel more easily at a lower cost, the arrangement shown in FIG. 16 is more advantageous over that shown in FIG. 17. Accordingly, if a high resolution is not needed or if the resolution of an image on the screen can be increased without increasing the number of pixels of the liquid crystal display panel, a liquid crystal display panel such as that shown in FIG. 16, having the same pixel arrangement as that of the three liquid crystal display panels for the three-panel type, is preferably used.

In addition, if the arrangement shown in FIG. 17 is adopted, then the area of each light-transmitting pixel opening decreases to less than one-third of the area of each square pixel shown in FIG. 16. As a result, the aperture ratio decreases.

However, even though a display device having the pixel arrangement shown in FIG. 17 has a lower pixel aperture ratio than a display device having the pixel arrangement shown in FIG. 16, an image projected onto the screen by the former type may actually be brighter than an image formed thereon by the latter type. That is to say, even if the pixel aperture ratio is set relatively high as shown in FIG. 16, an image having sufficiently high brightness may not be obtained.

One imaginable reason why the image projected gets dark even though the pixel aperture ratio is relatively high may be inappropriate incidence of outgoing light onto the projection lens. An F number is one of the indices representing the performance of a projection lens, and is obtained by dividing the focal length f of the lens by the diameter D of the light-transmitting area (i.e., entrance pupil) of the lens. Generally speaking, the smaller the F number of a projection lens, the greater the diameter D (or the area) of its entrance pupil is. That is to say, its light-receiving area has a broader angle and a greater quantity of light can be used to form a projected image. As a result, a brighter image can be formed at a small F number.

However, a projection lens always has to focus any light coming from a predetermined pixel onto an intended point on the screen, no matter which part of the projection lens that light has passed through. For that reason, as the F number of a projection lens decreases, it becomes more and more difficult, and takes an increasingly high cost, to make the projection lens as intended. Thus, the F number of a projection lens actually used must not be decreased excessively but needs to fall within a predetermined range.

In the projection type color image display device shown in FIG. 14, the light beams, which have gone out of the liquid crystal display panel 107, enters the projection lens 109 by way of the field lens 108. Each of these light beams is incident onto a predetermined point in the entrance pupil of the projection lens 109 in accordance with the angle at which the light beam has gone out of the liquid crystal display panel 107. If the projection lens 109 has no opaque portions, then the entrance pupil of the lens 109 corresponds to its cross section taken substantially vertically to the direction in which the light is incident. If a light beam has gone out of the liquid crystal display panel 107 in a direction that is substantially parallel to the optical axis of the lens 109, then the light beam passes through approximately the center of the pupil of the lens 109. On the other hand, if a light beam going out of the liquid crystal display panel 107 defines a large angle with the optical axis of the lens 109, then the light beam goes away from the lens 109. As described above, the F number of a projection lens has a lower limit. Accordingly, if a light beam going out of the liquid crystal display panel 107 defines an angle greater than the maximum allowable angle defined by the lowest possible F number, then the light beam will deviate from the entrance pupil of the projection lens 109. As a result, such a light beam cannot reach the screen 110, i.e., cannot contribute to the image projection. That is to say, even if each pixel of a liquid crystal display panel has a high aperture ratio and a large quantity of light goes out of the liquid crystal display panel, the angle defined by the outgoing light should not be too large to increase the brightness of an image formed on the screen.

Conversely, if a light beam going out of the liquid crystal display panel 107 defines an angle smaller than the minimum allowable angle obtained from the lowest possible F number, then the light beam will not be incident on the entire entrance pupil of the projection lens 109 (i.e., there is some margin for the F number of the projection lens). In such a situation, a bright image cannot be displayed, either. To increase the brightness of the image projected, the light beam going out of the liquid crystal display panel 107 should have its angle increased by decreasing the focal length of the microlenses for use to converge the incoming light onto the pixels, for example. Then, even a light beam having a low degree of parallelism with respect to the principal ray that has been emitted from the light source can also pass through the opening of a pixel. As a result, a brighter image can be projected.

As can be seen, to obtain a brightest possible image, a light beam should go out of the liquid crystal display panel at such an angle as to enter the entire entrance pupil of the projection lens having a limited size.

FIGS. 18 and 19 illustrate how the light going out of the liquid crystal display panel 107 is distributed in the entrance pupil of the projection lens 109 (corresponding to a cross section of the projection lens 109 in this case) when the pixels of the liquid crystal display panel 107 and the microlenses 106b or 106a are arranged as shown in FIGS. 16 and 17, respectively. The R light beam is vertically incident onto the microlens array 105 as shown in FIGS. 14 and 15, and therefore enters the center of the circular pupil plane 113 as shown in FIGS. 18 and 19. On the other hand, the B and G light beams each define an angle with respect to the R light beam, and therefore the point of incidence of the B or G light beam onto the pupil plane 113 deviates rightward or leftward from the center of the pupil plane 113 as shown in FIGS. 18 and 19. It should be noted that any light beam going out of the liquid crystal display panel 107 always passes through some area of the lens pupil plane 113 depending on its color as shown in FIGS. 18 and 19, no matter which pixel of the panel plane the light beam has passed through. This is because the light outgoing from the entire panel plane of the liquid crystal display panel 107 is collected by the field lens 108 onto the projection lens 109.

Each area of the entrance pupil, on which one of the three color light beams is incident, has its shape determined by the shape of its associated microlens, the opening shape of its associated pixel and the focal length of the microlens, for example. As can be seen from FIG. 19, if the pixels and the microlenses 106a are arranged as shown in FIG. 17, the R, G and B light beams are each distributed in a substantially square shape. On the other hand, if the pixels and the microlenses 106b are arranged as shown in FIG. 16, horizontally elongated rectangular R, G and B light beams are distributed so as to partially overlap with each other as shown in FIG. 18. In FIG. 18, an area in which the R and B light beams overlap with each other is identified by M (magenta), an area in which the R and G light beams overlap with each other is identified by Y (yellow), and an area in which the R, G and B light beams overlap with each other is identified by W (white).

When the arrangement shown in FIG. 16 is adopted, the image projected darkens in spite of the high pixel aperture ratio. This phenomenon occurs because the R, G and B light beams have horizontally elongated distributions on the entrance pupil of the projection lens due to the shape of its associated microlens. As a result, unusable areas U, on which no light beams are incident, are formed in the upper and lower parts of the projection lens. In such a situation, the projection lens cannot be used efficiently enough, and just a small percentage of light is usable for display purposes if the light has a low degree of parallelism with respect to the principal ray. Accordingly, a bright image cannot be projected onto the screen.

As can be seen, it is difficult for the conventional projection type display device to obtain a brightly projected image by using a liquid crystal display panel including substantially square pixels as shown in FIG. 16. However, to fabricate a liquid crystal display panel more easily at a lower cost, the arrangement shown in FIG. 16 is more advantageous over that shown in FIG. 17.

SUMMARY OF THE INVENTION

In order to overcome the problems described above, preferred embodiments of the present invention provide a projection type image display device that can display a bright image.

A projection type display device according to a preferred embodiment of the present invention includes: a light source for emitting light including a plurality of light components falling within mutually different wavelength ranges; a plurality of pixels for modulating the light independent of each other; a first optical system, which receives the light that has been emitted from the light source and directs the light toward the pixels; and a second optical system, which projects the light that has been modulated by the pixels onto a projection plane. The first optical system includes at least one optical element for converging the light components onto mutually different ones of the pixels in accordance with their wavelength ranges. The mutually different pixels are arranged in a predetermined azimuth on a panel plane on which the pixels are defined. The optical element has first and second lengths as measured in first and second directions, respectively. The first direction is defined by the predetermined azimuth, while the second direction is substantially perpendicular to the first direction. The second length is greater than the first length. The optical element converges the light components both in the first and second directions.

In one preferred embodiment of the present invention, the first optical system further includes a color separator for separating the light that has been emitted from the light source into a plurality of light beams falling within the mutually different wavelength ranges. The light beams are incident onto the optical element at mutually different angles in the predetermined azimuth.

In this particular preferred embodiment, the optical element may be a lens for converging the light beams, which have been incident thereon at the mutually different angles, onto the mutually different ones of the pixels.

More specifically, the lens is preferably made by performing the steps of: forming a resist film on a substrate; and exposing the resist film to radiation that has its intensity changed in accordance with an intended shape of the lens.

In another preferred embodiment of the present invention, the optical element separates the light that has been emitted from the light source into a plurality of light beams falling within the mutually different wavelength ranges in the predetermined azimuth.

For example, the optical element may be a hologram element.

In still another preferred embodiment, the second length is twice or more as long as a pitch at which the pixels are arranged in the second direction.

In yet another preferred embodiment, the optical element converges light beams representing three different colors onto associated three of the pixels, respectively.

In that case, the first length is preferably approximately as long as a pitch at which the pixels are arranged in the first direction, while the second length is preferably approximately three times as long as a pitch at which the pixels are arranged in the second direction.

Specifically, the optical element may converge the light beams representing the three different colors onto the three pixels that are adjacent to each other in the first direction.

In yet another preferred embodiment, the first optical system further includes at least second and third optical elements, which are adjacent to the at least one optical element in the first and second directions, respectively. The at least one optical element and the second optical element are preferably shifted from each other in the second direction.

In this particular preferred embodiment, the shift of the second optical element from the at least one optical element in the second direction is integral times as long as the pitch at which the pixels are arranged in the second direction.

Alternatively or additionally, the at least one optical element and the third optical element are preferably aligned with each other in the first direction.

In yet another preferred embodiment, each said pixel is defined in a display panel including a liquid crystal layer.

A projection type display device according to another preferred embodiment of the present invention includes: a light source for emitting light including a plurality of light components representing three colors; a plurality of pixels for modulating the light independent of each other; a first optical system, which receives the light that has been emitted from the light source and directs the light toward the pixels; and a second optical system, which projects the light that has been modulated by the pixels onto a projection plane. The first optical system includes an optical element for converging the light components representing the three colors onto mutually different ones of the pixels in accordance with their colors. The mutually different ones of the pixels are arranged in a predetermined azimuth on a panel plane on which the pixels are defined. In a first direction defined by the predetermined azimuth, the optical element has a length approximately equal to a pitch at which the pixels are arranged. The optical element converges the light components both in the first direction and in a second direction, which is substantially perpendicular to the first direction. The optical element converges the light components representing the three colors onto associated three of the pixels that are adjacent to each other in the first direction.

In one preferred embodiment of the present invention, the second optical system includes an image shifter for shifting the image formed on the projection plane by projecting the light, which has been passed through the pixels, at mutually different positions on the projection plane with time.

As used herein, the "optical element" refers to a minimum unit structure that can perform a predetermined optical function. Typically, one optical member (e.g., lens array or lens sheet) is made up of a plurality of optical elements (e.g., lenses) that are arranged to form a regular pattern. It should be noted that one optical element does not have to be identifiable from another by its shape. Instead, a predetermined portion (or predetermined region) of an optical member will be herein sometimes referred to as an "optical element" as long as that portion or region can perform the intended optical function. For example, where an array of hologram elements (an exemplary optical member) is subdivided into a plurality of regions, each performing a predetermined optical function (e.g., condensing function), each such subdivided region will be herein referred to as a "hologram element" (an exemplary optical element). In that case, the size of each optical element is represented by that of each predetermined region.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Embodiment 1

Hereinafter, a single-panel projection type color liquid crystal display device, including a single liquid crystal display panel having a plurality of pixels that can modulate incoming light beams independent of each other, will be described as a first specific preferred embodiment of the present invention.

Figure 1:
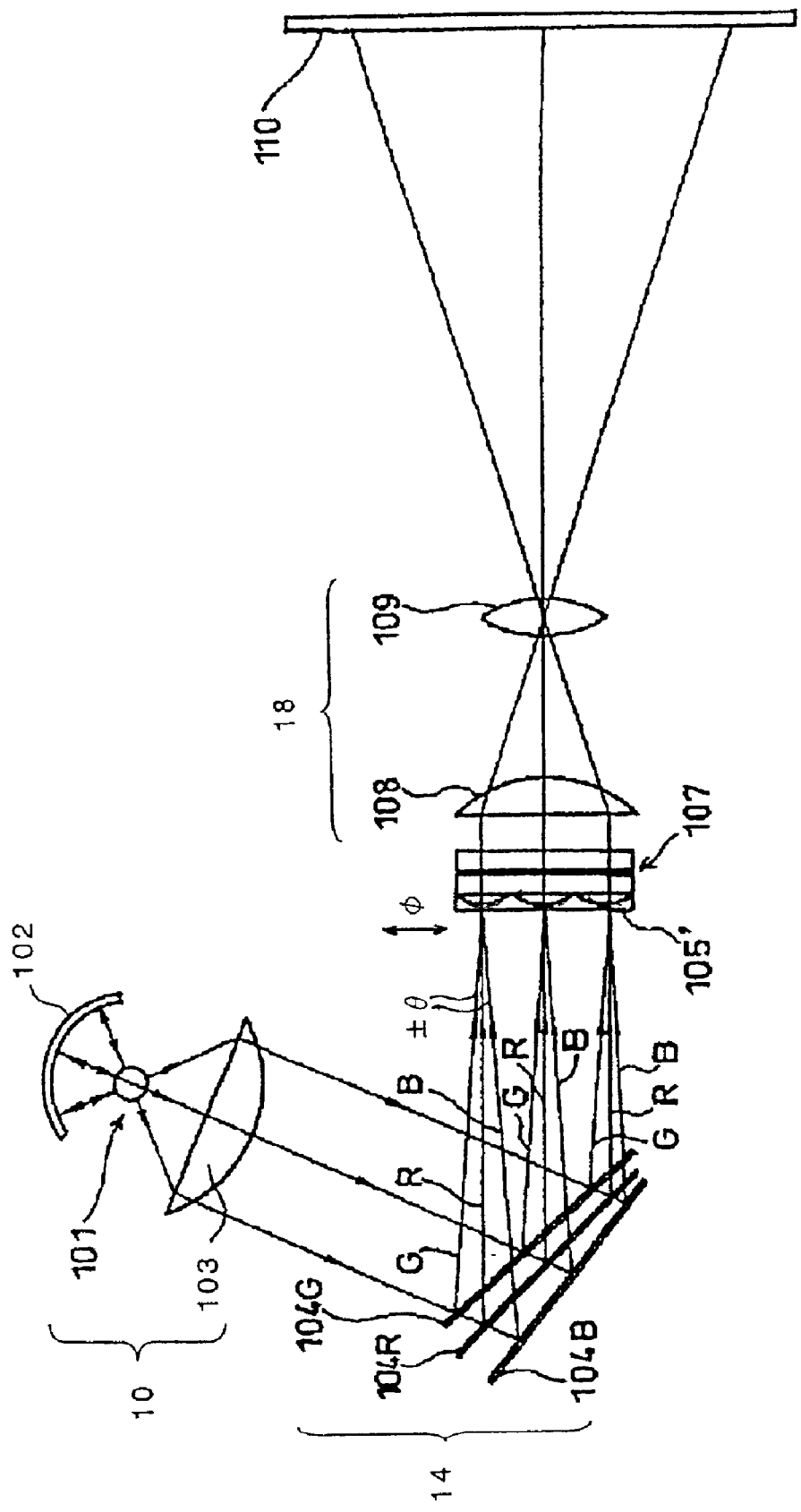
FIG. 1 schematically illustrates an arrangement for a projection type color image display device according to a first specific preferred embodiment of the present invention.

FIG. 1 illustrates an overall arrangement for a projection type color image display device according to the first preferred embodiment. As shown in FIG. 1, the display device includes light source section 10, color separator 14, liquid crystal display panel 107, microlens array 105', and projecting optical system 18. The light source section 10 includes white light source 101, spherical mirror 102 and condenser lens 103. The color separator 14 includes dichroic mirrors 104R, 104G and 104B. Multiple pixels have been formed in the liquid crystal display panel 107. The microlens array 105' is provided on one surface of the liquid crystal display panel 107 on which the incoming light is incident. And the projecting optical system 18 includes field lens 108 and projection lens 109. This projection type color image display device displays an image on a screen (i.e., projection plane) 110, which is disposed in front of the projection lens 109. As used herein, when one member is located "in front of" another member, the former is ahead of the latter in the direction in which the light travels.

As the white light source 101, a known metal halide lamp may be used. Alternatively, any other light source such as halogen lamp or xenon lamp may also be used. The light emitted from the light source 101 is white light including R, G and B light components. The light is collimated by the condenser lens 103 into parallel light rays, which are then directed toward the dichroic mirrors 104R, 104G and 104B. The spherical mirror 102 is provided to increase the quantity of the light entering the condenser lens 103 by reflecting part of the light emitted from the light source 101.

Although not shown in FIG. 1, this display device further includes a UV-IR cut filter in front of the condenser lens 103. The UV-IR cut filter is preferably provided to cut UV and IR rays that would otherwise be incident onto the liquid crystal display panel 107. In this manner, substantially no UV or IR rays enter the liquid crystal display panel 107 and an unwanted rise in temperature of the liquid crystal display panel 107 is avoidable.

Each of the dichroic mirrors 104R, 104G and 104B selectively reflects its associated color light beam (or component) falling within the red, green or blue wavelength range of the visible radiation but transmits the other two light beams falling within the non-selected wavelength ranges. For example, the dichroic mirror 104R selectively reflects a light beam falling within the R wavelength range but transmits the other two light beams falling within the G and B wavelength ranges, respectively. These dichroic mirrors 104R, 104G and 104B are disposed so as to define mutually different angles with the direction in which the substantially parallel light rays, emitted from the light source section 10, travel. These dichroic mirrors 104R, 104G and 104B may be formed by a known multilayer coating technique.

The three light beams falling within the three different wavelength ranges, which have been reflected from the dichroic mirrors 104R, 104G and 104B, are then incident onto the microlens array 105'. In this case, the light beam that has been reflected from the dichroic mirror 104R (i.e., R light beam) is incident substantially vertically onto the microlens array 105'. On the other hand, each of the other two light beams, which have been reflected from the dichroic mirrors 104G and 104B, respectively (i.e., G and B light beams), is incident onto the microlens array 105' from a direction that defines an angle of ±θ degrees relative to the direction of the R light beam on a plane parallel to the paper sheet of FIG. 1.

In this manner, when viewed from a certain direction, the three light beams representing the three primary colors are incident onto the microlens array 105' at mutually different angles. That is to say, the three light beams are incident onto the microlens array 105' so as to define mutually different angles with a predetermined azimuth (angle) φ on a panel plane. It should be noted that the "panel plane" typically refers to a plane of a display panel (i.e., the liquid crystal display panel 107 in this preferred embodiment) in which multiple pixels are defined. Also, the direction indicated by the arrow φ in FIG. 1 (i.e., the direction that is substantially parallel to the paper sheet and to the panel plane of the liquid crystal display panel 107) will be herein referred to as a "direction defined by the azimuth φ".

In the preferred embodiment shown in FIG. 1, in the azimuth φ on the panel plane, the R, G and B light beams are incident onto the microlens array 105' at angles of 0, θ and −θ degrees, respectively. It should be noted that the incident angle (θ degrees) of the G light beam is herein regarded as distinct from that (−θ degrees) of the B light beam. For that reason, these light beams are herein supposed to be incident onto the microlens array 105' "at mutually different angles".

In this preferred embodiment, the light beams representing the three primary colors are incident onto the microlens array 105' so as to define mutually different angles with the predetermined azimuth φ. However, in the direction defined on the panel plane by an azimuth that forms an angle of 90 degrees with the azimuth φ (i.e., in the direction coming out of the paper of FIG. 1), these three light beams have the same incident angle.

In this preferred embodiment, the white light source 101 and the dichroic mirrors 104R, 104G and 104B for separating the white light into the three light beams together constitutes a light source unit that can make the light beams, falling within mutually different wavelength ranges, incident onto the microlens array 105' at respectively different angles in the predetermined azimuth. However, as long as the light beams representing the three primary colors can be incident onto the microlens array 105' at mutually different angles in the predetermined azimuth φ, the preferred combination of the light source section and the dichroic mirrors as shown in FIG. 1 does not have to be used but any of various other preferred embodiments may also be adopted.

For example, to separate the white light into a plurality of color light beams, a planar hologram element 201 may also be used as shown in FIG. 2A instead of the dichroic mirrors 104R, 104G and 104B. The planar hologram element 201 can separate the incoming light into a plurality of light beams going out at mutually different angles in accordance with the wavelength range thereof. In the display device shown in FIG. 2A, the planar hologram element 201 is provided on the microlens array 105'. This planar hologram element 201 may or may not be adhered to the microlens array 105'. As the planar hologram element 201, an element as disclosed in Japanese Laid-Open Publication No. 8-297327 may be used, for example.

The white light, which has been emitted from the white light source 101 and then collimated by the condenser lens 103, is diffracted and separated into the respective color light beams by the planar hologram element 201 as shown in FIG. 2B. The light beams in respective colors go out of the planar hologram element 201 at mutually different angles. Specifically, each of the G and B light beams goes out of the planar hologram element 201 so as to define a predetermined angle of θ or −θ degrees with the R light beam. On going out of the hologram element 201, these light beams enter the microlens array 105'. In this manner, the respective color light beams can be incident onto the microlens array 105' at mutually different angles as in the preferred embodiment using the dichroic mirrors 104R, 104G and 104B as shown in FIG. 1.

The R, G and B light beams, which have been incident onto the microlens array 105' at mutually different angles by way of the dichroic mirrors 104R, 104G and 104B or the planar hologram element 201, are then converged by each of the microlenses 106c (see FIG. 3) included in the array 105' onto the respective openings of associated pixels of the liquid crystal display panel 107. In the preferred embodiments shown in FIG. 1 and FIGS. 2A and 2B, the microlens array 105' and the liquid crystal display panel 107 are stacked one upon the other to form a single panel structure. However, the array 105' and the panel 107 may also be disposed in any of various other positions. Also, if necessary, any other optical element such as polarizer or phase plate may also be provided on the outer surface of the liquid crystal display panel 107 or that of the microlens array 105'.

In this preferred embodiment, the liquid crystal display panel 107 has a screen size of about 33 mm diagonally. The pitch P of its pixels is about 26 μm both horizontally and vertically. The pixels each have a square planar shape and are arranged in columns and rows (i.e., in matrix). Also, the total number of pixels of this liquid crystal display panel 107 is 768 vertically by 1,024 horizontally. This liquid crystal display panel 107 is a so-called "XGA (extended graphics array)" type. In this preferred embodiment, a conventional liquid crystal display panel, included in a three-panel projection type image display device available as an office automation unit, may be used as the liquid crystal display panel 107.

Next, the positional relationship between the respective pixels of the liquid crystal display panel 107 and the multiple microlenses 106c included in the microlens array 105' will be described with reference to FIG. 3.

Figure 3:
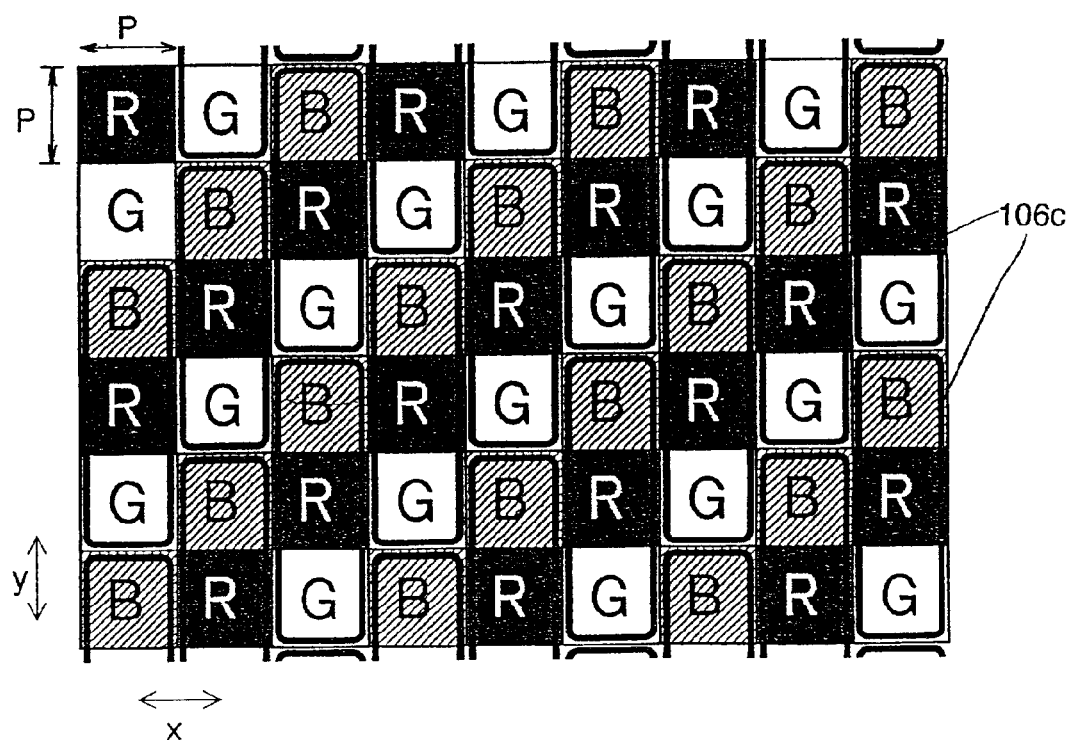
FIG. 3 is a plan view illustrating a positional relationship between microlenses and pixel regions of a liquid crystal display panel that are provided for the display device shown in FIG. 1.

In the preferred embodiment shown in FIG. 3, a mosaic arrangement, in which each set of R, G or B square pixel regions are arranged in line obliquely, is adopted. However, each of the R, G and B pixels is not actually provided with a color filter in its corresponding color. Instead, in this preferred embodiment, the R, G or B light beam (more exactly, a condensed light ray) is incident onto each R, G or B pixel. In response to a gray-scale tone signal representing one of the three primary colors, an image signal processor (not shown) associated with the liquid crystal display panel 107 controls the light modulating states of the R, G or B pixels.

The microlens array 105' may be made of a transparent substrate of glass, for example. On one surface of the transparent substrate, rectangular microlenses 106c, which are elongated vertically (i.e., in the y direction shown in FIG. 3) and which have a size corresponding to three pixels of the liquid crystal display panel 107, are densely arranged to form a mosaic pattern. In FIG. 3, the respective microlenses 106c are illustrated as being spaced apart from each other so as to be easily distinguished from each other. However, these lenses 106c are preferably adjacent to each other with no gaps left between them. The horizontal size of the microlenses 106c (or the arrangement pitch thereof as measured in the x direction shown in FIG. 3) is preferably set at about 26 μm, which is approximately equal to the pixel pitch P of the liquid crystal display panel 107. On the other hand, the vertical size of the microlenses 106c, i.e., the arrangement pitch thereof as measured in the y direction, is preferably set at about 78 μm, which is approximately three times as long as the pixel pitch P. That is to say, in this preferred embodiment, each microlens 106c covers a set of R, G and B pixels that are vertically adjacent to each other.

As shown in FIG. 3, each set of microlenses 106c, which are adjacent to each other in the row direction (i.e., in the x direction), are shifted from each other vertically (i.e., in the y direction). On the other hand, each set of microlenses, which are adjacent to each other in the column direction (i.e., in the y direction), are aligned with each other horizontally (i.e., in the x direction). More specifically, taking a microlens 106c belonging to one column as an example, one horizontally adjacent microlens 106c, which belongs to a column on the left-hand side of the former microlens 106c, is shifted downward from the former microlens 106c by one pixel (i.e., by one pixel pitch). Conversely, another horizontally adjacent microlens 106c, which belongs to a column on the right-hand side of the former microlens 106c, is shifted upward from the former microlens 106c by one pixel.

The R, G and B light beams are incident onto these microlenses at mutually different angles in the direction defined by the azimuth φ. In this preferred embodiment, the direction defined by the azimuth φ is supposed to be parallel to the shorter side of the microlenses 106c (i.e., the x direction) on the panel plane of the liquid crystal display panel 107 (i.e., the plane on which the pixels are defined). That is to say, the microlenses 106c have a size approximately equal to the pixel pitch P in the direction defined by the azimuth φ and have a size approximately three times as long as the pixel pitch P in the direction perpendicular to the former direction.

An R light beam is converged onto an R pixel region located under the center of one microlens 106c, while B and G light beams are converged onto B and G pixel regions that are not covered with the former microlens 106c but with two horizontally adjacent microlenses 106c, respectively. In this manner, the microlenses 106c can converge multiple light beams in respective colors onto mutually different pixels that are arranged in the direction defined by the azimuth φ (along the shorter side of the microlenses 106c).

Next, it will be described with reference to FIGS. 4, 5 and 6 which paths the R, G and B light beams will follow after having been incident onto the microlenses 106c that are arranged as shown in FIG. 3.

Figure 4:
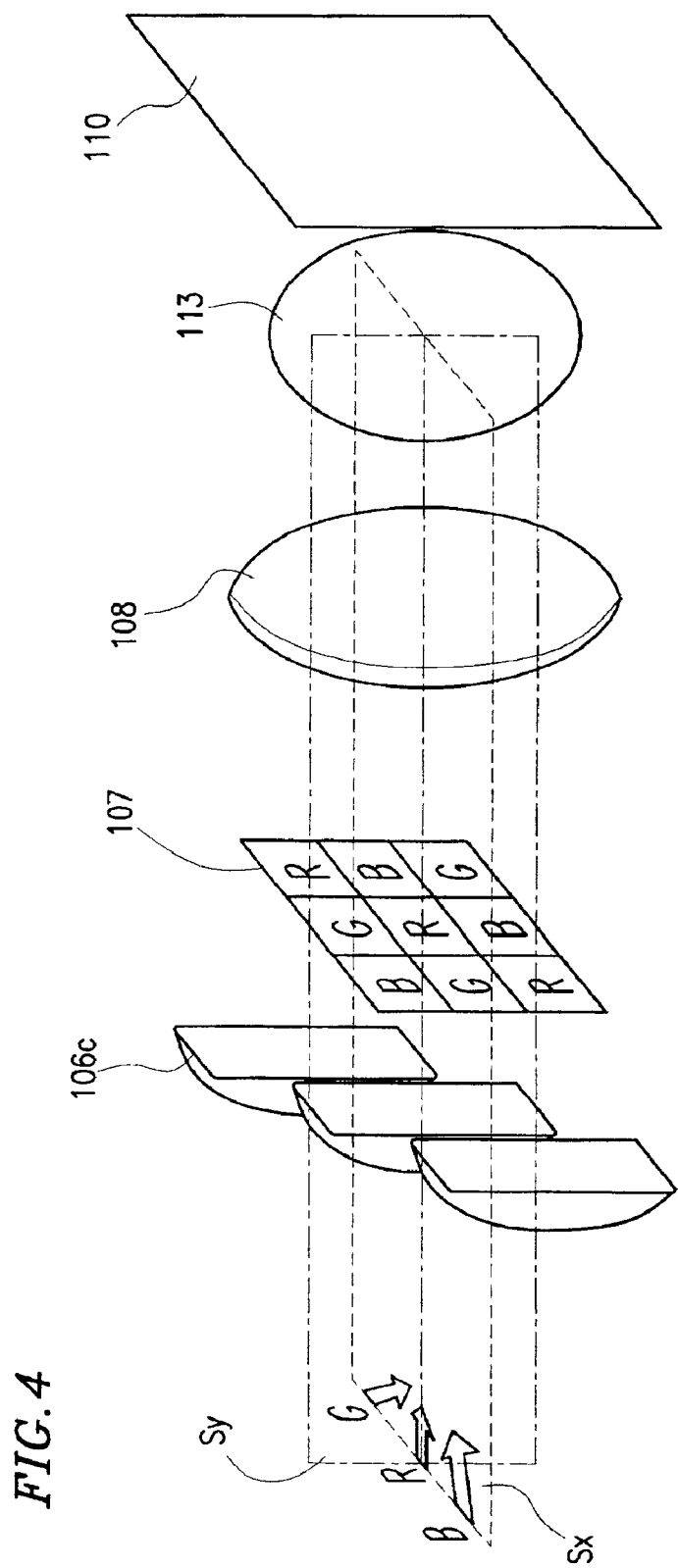
FIG. 4 is a perspective view illustrating a simplified arrangement for the respective components of the display device shown in FIG. 1.

Suppose an Sx plane exists so as to be perpendicular to the panel plane of the liquid crystal display panel 107 and parallel to the shorter side of the microlenses 106c as shown in FIG. 4. In that case, this shorter-side direction is aligned with the azimuth φ in this preferred embodiment. On this Sx plane, the R, G and B light beams are incident onto the microlenses 106c from three different directions.

Figure 5:
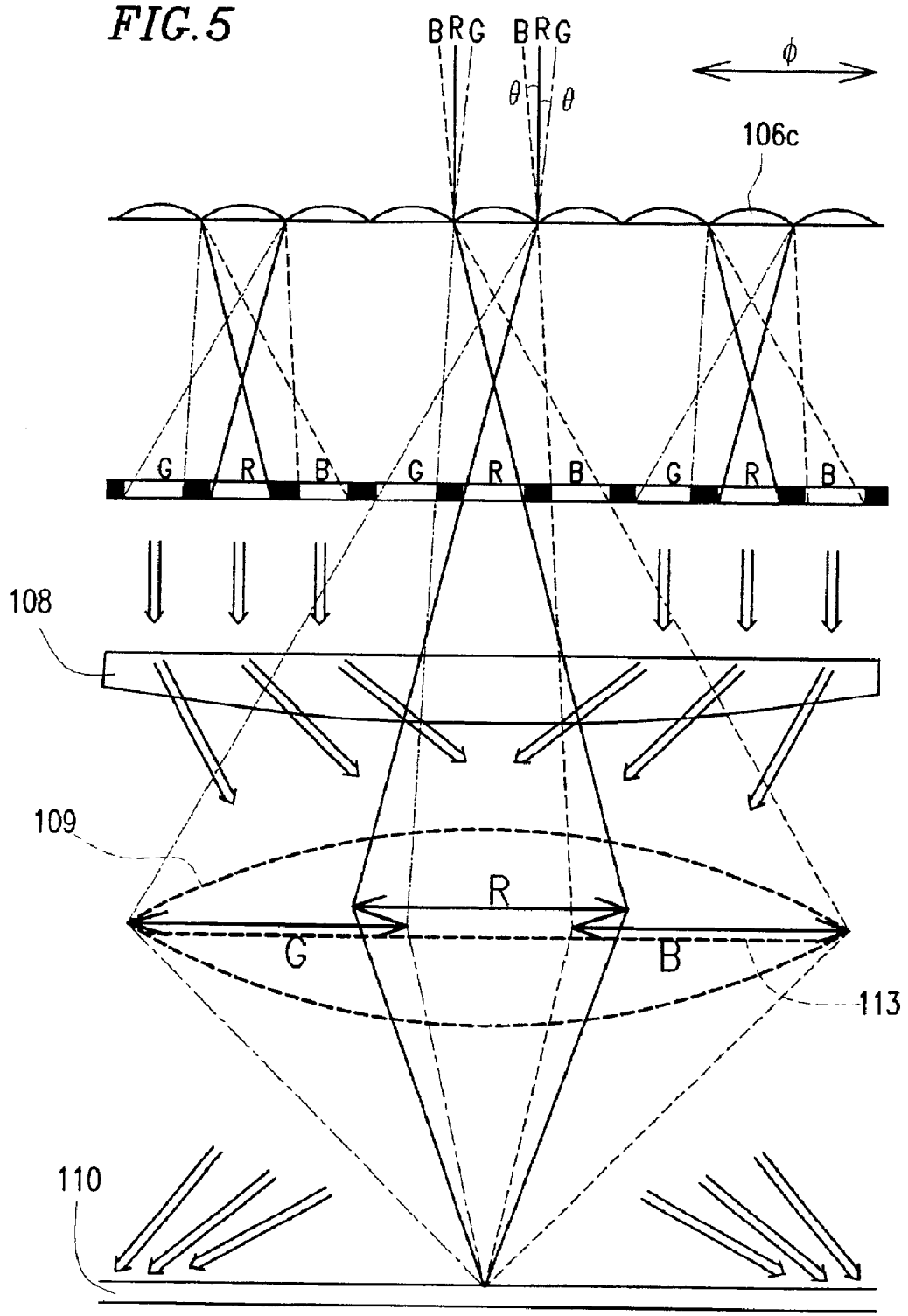
FIG. 5 illustrates which paths respective light beams follow on the Sx plane shown in FIG. 4.
Figure 6:
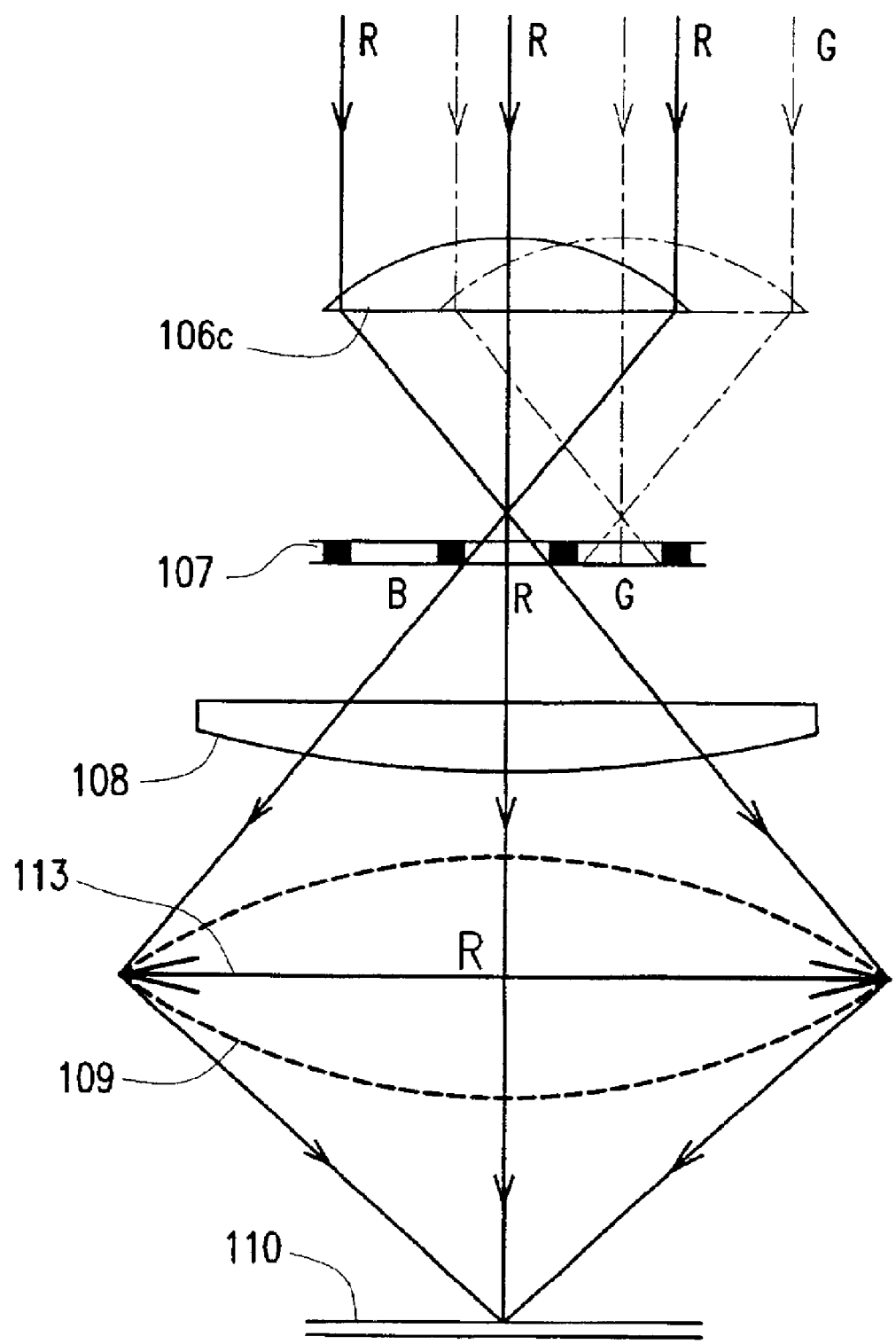
FIG. 6 illustrates which paths the respective light beams follow on the Sy plane shown in FIG. 4.

FIG. 5 illustrates which paths the respective light beams follow on this Sx plane. As shown by the solid lines in FIG. 5, the R light beam is incident vertically onto a microlens 106c. On the other hand, the B and G light beams are incident onto the same microlens 106c so as to define an angle of ±θ degrees with the R light beam as shown in FIG. 5 by the dashed lines and the one-dot chains, respectively.

The respective light beams (or respective light components) that have been incident onto the microlens 106c are then converged or collected onto three associated pixels that are arranged in the direction defined by the azimuth φ. That is to say, the microlens 106c functions in such a manner as to converge the light beams in respective colors onto mutually different ones of the pixels in the azimuth φ in accordance with their colors. Specifically, the R light beam is converged onto an R pixel region that is located under, and covered with, the microlens 106c. On the other hand, the B and G light beams are converged onto B and G pixel regions that are located on the right- and left-hand sides of the R pixel region, respectively. As can be easily understood from FIG. 5, these B and G pixel regions are not covered with the associated microlens 106c through which the B and G light beams have passed.

In response to image signals, the respective light beams that have been converged onto those pixels are then modulated into their desired states. Thanks to the condensing function of the microlens 106c, most of the light emitted from the light source 101 can pass through the respective openings of the pixels. As a result, the light emitted from the light source 101 can be utilized highly efficiently.

Each of the R, G and B light beams, which has been converged toward the opening of its associated pixel and modulated by the pixel, passes through the field lens 108 while diverging, and then enters the projection lens 109. In this case, each of these color light beams is distributed in the entrance pupil 113 of the projection lens 109 so as to have a width narrower than the diameter of the entrance pupil 113 as shown by the arrows in FIG. 5. Thereafter, the light beam that has passed through the projection lens 109 is focused onto the screen 110.

Referring back to FIG. 4, an Sy plane is also supposed to exist so as to cross the Sx plane and the panel plane at right angles. FIG. 6 illustrates which paths the R, G and B light beams follow on this Sy plane. On this Sy plane, the R, G and B light beams are incident onto the microlens 106c so as to define substantially the same angle with the panel plane. It should be noted that on this Sy plane, the microlens 106c has a size corresponding to three pixels.

On this Sy plane, the R light beam is converged by such a microlens 106c to a greater degree than on the Sx plane shown in FIG. 5. Accordingly, the light beam that has gone out of the pixel also diverges to a greater degree on this Sy plane. As a result, the R light beam that has entered the entrance pupil 113 of the projection lens 109 is distributed on this Sy plane so as to have a size approximately equal to the diameter of the lens 109.

Figure 7:
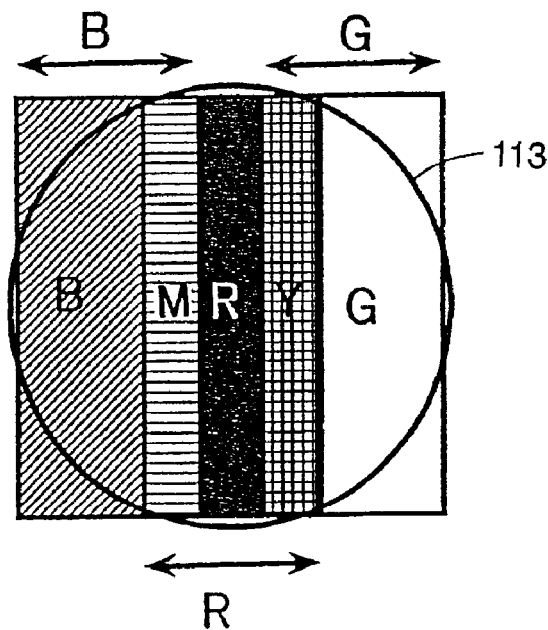
FIG. 7 illustrates how the respective light beams are distributed in the entrance pupil of a projection lens provided for the display device shown in FIG. 1.

In this manner, each of the R, G and B light beams forms a distribution that is changeable in the entrance pupil 113 of the projection lens 109 with the shape of the microlens 106c. Thus, each of the R, G and B light beams has a vertically elongated rectangular distribution in the entrance pupil 113 as shown in FIG. 7. These distributions partially overlap with each other, thereby forming a substantially square light distribution region.

Therefore, if the microlenses have a relatively small size in the direction defined by the azimuth φ and a relatively large size in the direction perpendicular to the former direction, then the entire entrance pupil 113 of the projection lens 109 can be used effectively enough to obtain a brightly projected image. Since the pupil plane 113 is circular, each light beam may have some components not contributing to the projected image. However, compared to the conventional arrangement, almost all pupil plane can be used much more effectively according to this preferred embodiment. As a result, the brightness of the image projected can be increased greatly. It should be noted that as disclosed in Japanese Laid-Open Publication No. 8-114780, the B and G light beams may partially deviate from the entrance pupil 113 on purpose as long as a white balance is attainable by correcting the difference in spectral intensity of the R, G and B light beams.

On the G and B pixels that are respectively located, in the y direction, over and under the R pixel corresponding to the center of one microlens 106c, the G and B light beams are converged by two other microlenses 106c. In the example illustrated in FIG. 3, the two other microlenses 106c are respectively located on the lower left side and on the upper right side of the central microlens 106c. In this preferred embodiment, each microlens 106c converges light beams onto pixels other than the pixel that the microlens 106c itself covers. Also, since the microlenses 106c are arranged so as to vertically shift from each other by one pixel pitch P, there are no pixels on which no light beams are converged. Furthermore, to converge the light beam onto the pixel positioned around the periphery of the liquid crystal display panel 107, extra microlenses 106c are preferably formed around the periphery of the display area.

In this preferred embodiment, each microlens 106c has substantially the same focal length on both of the Sx and Sy planes. That is to say, the microlens 106c outputs a condensed light beam with no aberration. Thus, an intended image can be formed on the screen.

The microlens array 105' may be made by a conventional ion exchange method (see Appl. Opt. Vol. 21, p. 1052 (1984) or Electron. Lett. Vol. 17, p. 452 (1981), for example), swelling method (see Suzuki et al., "New Method of Making Plastic Micro Lens", the $24^{th}$ Microoptics Conference, for example), thermal deformation method (see Zoran D. Popovic et al., Technique for Monolithic Fabrication of Microlens Arrays", Appl. Opt. Vol. 27, p. 1281 (1988), for example), evaporation method (see Japanese Laid-Open Publication No. 55-135808, for example), thermal transfer method (see Japanese Laid-Open Publication No. 61-64158, for example), mechanical machining, the method disclosed in Japanese Laid-Open Publication No. 3-248125 or any other suitable method.

Figure 8:
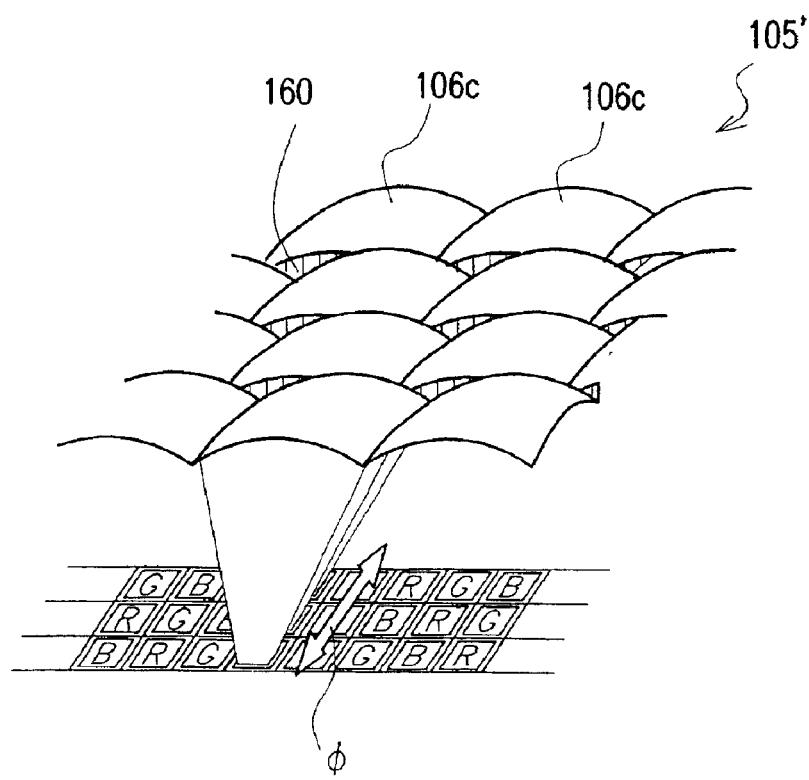
FIG. 8 is a perspective view illustrating a microlens array provided for the display device shown in FIG.

It should be noted, however, that each of the microlenses 106c included in the microlens array 105' needs to perform the desired condensing function and that there is a level difference between the center of each lens 106c and the periphery thereof. This is because the lens surface is an axisymmetric curved surface that is symmetrical about a normal that passes the center of the lens 106c. Also, the microlenses 106c are arranged in the shorter-side direction so that the respective centers thereof vertically shift from each other by one pixel pitch on a line-by-line basis in accordance with the arrangement of the R pixels in the liquid crystal display panel 107. In other words, the microlenses 106c are arranged so as to vertically shift from each other by one-third of the longer-side pitch thereof. Accordingly, as shown in FIG. 8, the microlens array 105' has a level difference 160 in the boundary between each pair of microlenses 106c that are adjacent to each other in the shorter-side direction thereof.

Ideally, this boundary level difference 160 stands perpendicularly to the plane on which the microlenses 106c are arranged to form the array 105'. Actually, though, when this microlens array 105' is made by one of the aforementioned methods, the curvature of the lenses 106c may deviate from their setting. In that case, those lenses are no longer axisymmetric, thus causing some aberration. Also, the level difference portion 160 may tilt unintentionally to decrease the area of the curved surface of the microlenses 106c disadvantageously. As a result, the optical efficiency of the lenses 106c may decrease and the image projected may darken to a certain degree.

It is true that these problems are avoidable if the microlenses 106c are formed as Fresnel lenses. To form the microlens array 105' in a more desirable shape, however, it is preferable to combine a half-tone exposure method or electron beam lithography, in which exposure intensities are graded, with an anisotropic etching process as will be described below.

Figure 9A:
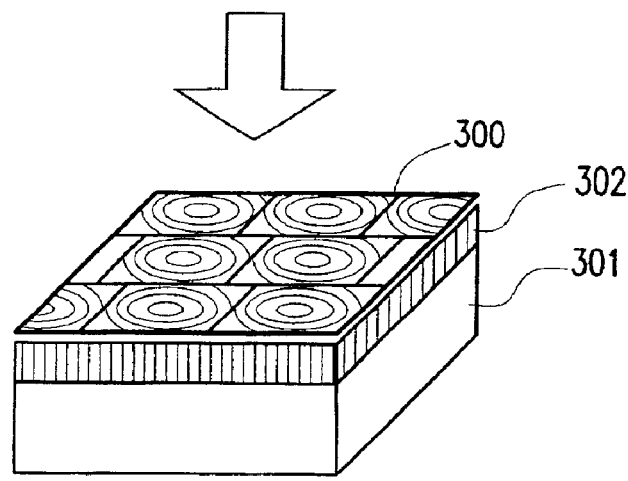
FIGS. 9A through 9D are perspective views illustrating respective process steps for making the microlens array of the first preferred embodiment.
Figure 9B:
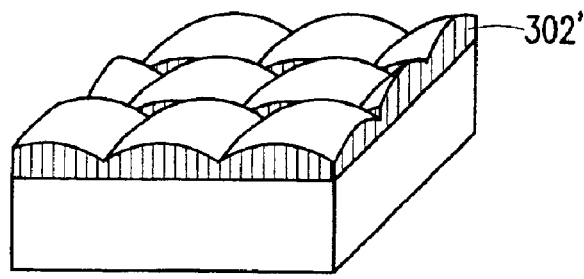

FIGS. 9A through 9D illustrate respective process steps for making the microlens array 105' according to this preferred embodiment. First, by using a contour map corresponding to the surface shape of the microlenses to be made, a mask 300, of which the gradation (or light transmittance) changes with the height of the microlenses, is prepared. Next, a resist film 302, which has been applied onto the surface of a material substrate 301, is exposed to radiation through this mask 300 as shown in FIG. 9A. Alternatively, the resist film plane 302 may also be exposed to, and scanned by, an electron beam or laser beam that has its intensity modulated in accordance with the height of the microlenses to be made. Subsequently, by developing the resist film 302 that has been exposed in this manner, a resist film 302' having a surface shape corresponding to the intended shape of the microlens array 105' is formed on the surface of the material substrate 301 as shown in FIG. 9B.

Figure 9C:
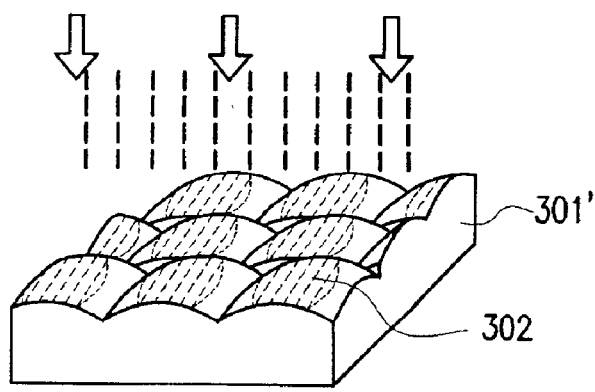

Thereafter, the material substrate 301 is vertically etched anisotropically by a dry etching process, for example, using the resist film 302' as a mask. In this manner, a material substrate 301' having the intended curved surface and level differences is obtained as shown in FIG. 9C.

Figure 9D:
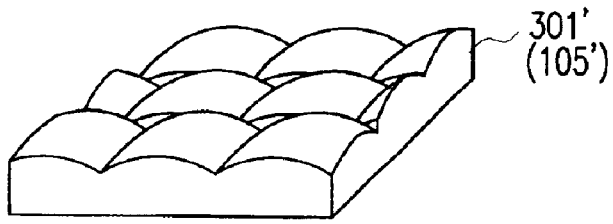

If the material substrate 301 is made of a transparent material such as glass, then the material substrate 301' having the intended surface shape may be used as it is as the microlens array 105' as shown in FIG. 9D. Alternatively, the microlens array 105' may also be formed by making a die from this material substrate 301' and then transferring the shape of the die onto a resin film, for example. As another alternative, a glass or metal substrate may also be processed into the negative of the material substrate 301' through similar process steps and the shape of the negative obtained may be transferred onto a resin film by using it as a lens die.

In the process step shown in FIG. 9A, the gradation pattern of the mask 300 should be defined appropriately in view of the difference in etch rate between the material substrate 301 and the resist film 302 so that the desired curved surface and level differences will be formed for the microlens array when the etching process is finished.

The microlens array obtained in this manner has a high shape precision. Also, the lenses thereof have the desired curved surface and a steep level difference is formed between the lenses. By using such a microlens array, the light emitted from the light source can be used for display purposes much more efficiently. As a result, an even more brightly projected image can be obtained.

In the preferred embodiments described above, the incoming white light is separated into the R, G and B light beams in the x direction corresponding to the horizontal direction of the liquid crystal display panel 107. Alternatively, the white light may also be separated vertically (i.e., in the y direction) by disposing the dichroic mirrors 104R, 104G and 104B so that the parallel light rays coming from the light source section are angled vertically and by using a microlens array 105' made up of horizontally elongated rectangular microlenses 106c. Even in this alternative preferred embodiment, one microlens 106c is also associated with three pixels and the direction in which the light is separated is aligned with the shorter side of the lenses. In that case, the distributions of the R, G and B light beams in the entrance pupil 113 of the projection lens 109 are obtained by rotating those shown in FIG. 7 by 90 degrees.

Also, in the preferred embodiments described above, the R light beam is supposed to be incident vertically onto the liquid crystal display panel. However, it is not always necessary to make one of the R, G and B light beams incident vertically onto the liquid crystal display panel. Rather the incident angles of the respective light beams onto the microlenses need to be defined, and the respective light beams need to enter their associated pixels through the microlenses, so that the R, G and B light beams form focal points that are substantially aligned with each other at regular intervals on a plane that is parallel to the panel plane of the liquid crystal display panel. In this case, it is not always necessary that each microlens is disposed to cover three pixel regions.

For example, where an image should be projected upward from an image display device placed on the floor, the light source unit, liquid crystal display panel, field lens and projection lens may have to be gradually shifted upward from the floor plane so that upwardly angled light beams (i.e., light beams that are obliquely incident onto the panel plane from below the panel on the Sy plane shown in FIGS. 4 and 6) are incident onto the liquid crystal display panel. An image display device according to an alternative preferred embodiment of the present invention may adopt such an arrangement. In that case, the positional relationship between the microlenses and the pixel regions of the liquid crystal display panel should be defined appropriately so that the respective light beams are obliquely incident onto the microlenses from below the lenses on the Sy plane and that the focal points of those light beams correspond to the openings of predetermined pixel regions. Then, the boundary between adjacent microlenses 106c is not aligned with the boundary between adjacent pixel regions. Even so, a bright image still can be projected according to the present invention.

Figure 17:
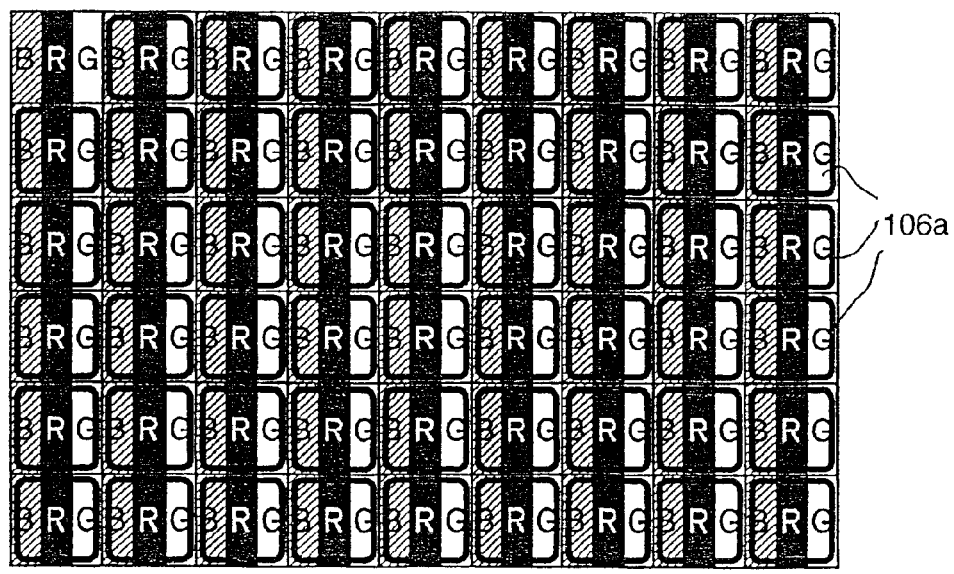
FIG. 17 is a plan view illustrating a positional relationship between microlenses and pixels of a liquid crystal display panel that are provided for another conventional projection type color image display device.
Figure 18:
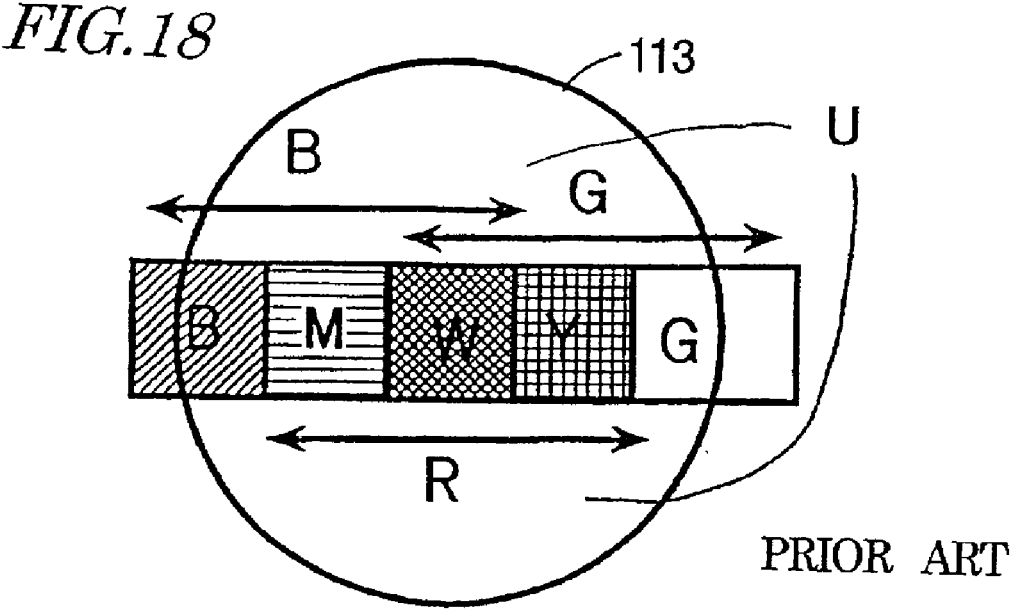
FIG. 18 illustrates how respective light beams are distributed in the entrance pupil of a projection lens in the display device in which the microlenses and the pixel regions of the liquid crystal display panel are arranged as shown in FIG. 16.
Figure 19:
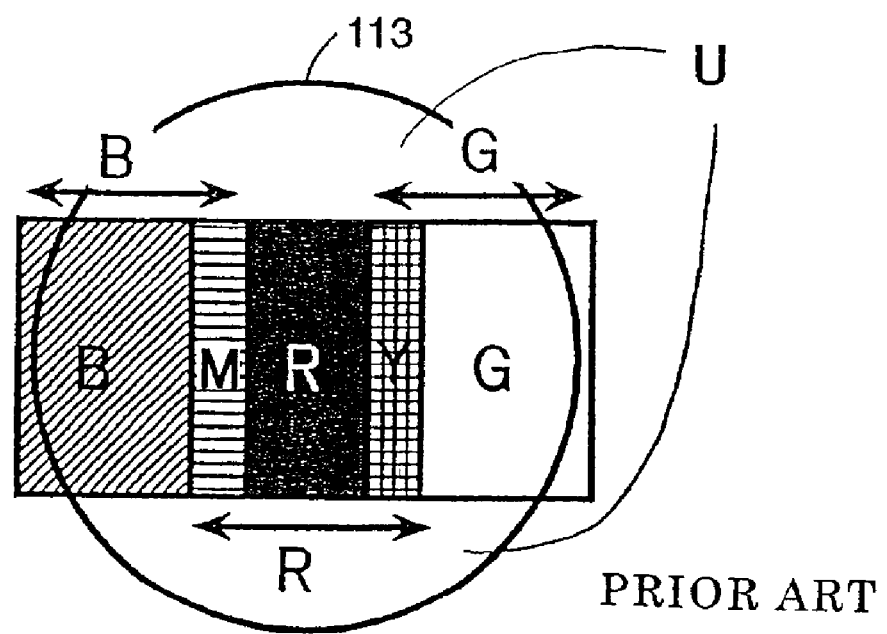
FIG. 19 illustrates how respective light beams are distributed in the entrance pupil of a projection lens in the display device in which the microlenses and the pixel regions of the liquid crystal display panel are arranged as shown in FIG. 17.

As described above, in the image display device of this preferred embodiment, the R, G and B light beams are rectangularly distributed in the pupil plane of the projection lens so as to be elongated perpendicularly to the direction in which the incoming light is separated into the R, G and B light beams (i.e., the direction defined by the azimuth φ) as shown in FIG. 7. As also shown in FIG. 7, the R, G and B light beams together form an approximately square distribution. As a result, the entire pupil of the projection lens can be used efficiently and the brightness of the image projected can be increased. In addition, unlike the conventional example shown in FIG. 17, the liquid crystal display panel of this preferred embodiment does not have an increased number of pixels, thus avoiding the unwanted increase in fabrication cost of the liquid crystal display panel.

A so-called "lenticular lens" may also be used for the liquid crystal display panel having the pixel arrangement shown in FIG. 3. A lenticular lens shows a condensing function only in the direction in which incoming light is separated into light beams in respective colors (i.e., shows no condensing function in the direction perpendicular to the former direction). Even so, the distribution of the respective light beams in the pupil plane of the projection lens may look like that of this preferred embodiment shown in FIG. 7.

However, if a lenticular lens is used, the light beams are not converged perpendicularly to the direction in which the incoming light is separated into the respective light beams. Accordingly, part of the light that has passed through the lens is cut off by the BM and cannot pass through the liquid crystal display panel. Thus, even though the light beams are similarly distributed in the pupil plane of the projection lens, the total quantity of light projected actually decreases.

In contrast, in the liquid crystal display device of this preferred embodiment, the light beams are converged toward the pixel openings by using the microlenses that can exhibit the condensing function perpendicularly to the direction in which the incoming light is separated into those light beams. Accordingly, the quantity of light cut off by the pixel BM decreases considerably, while the quantity of light passed through the projection lens increases instead. As a result, a brighter image can be projected onto the screen.

Embodiment 2

Hereinafter, an image display device according to a second specific preferred embodiment of the present invention will be described with reference to FIG. 10 and FIGS. 11A through 11C. In FIGS. 10, 11A, 11B and 11C, each member having substantially the same function as the counterpart of the first preferred embodiment will be identified by the same reference numeral for convenience sake and the description thereof will be omitted herein.

Figure 10:
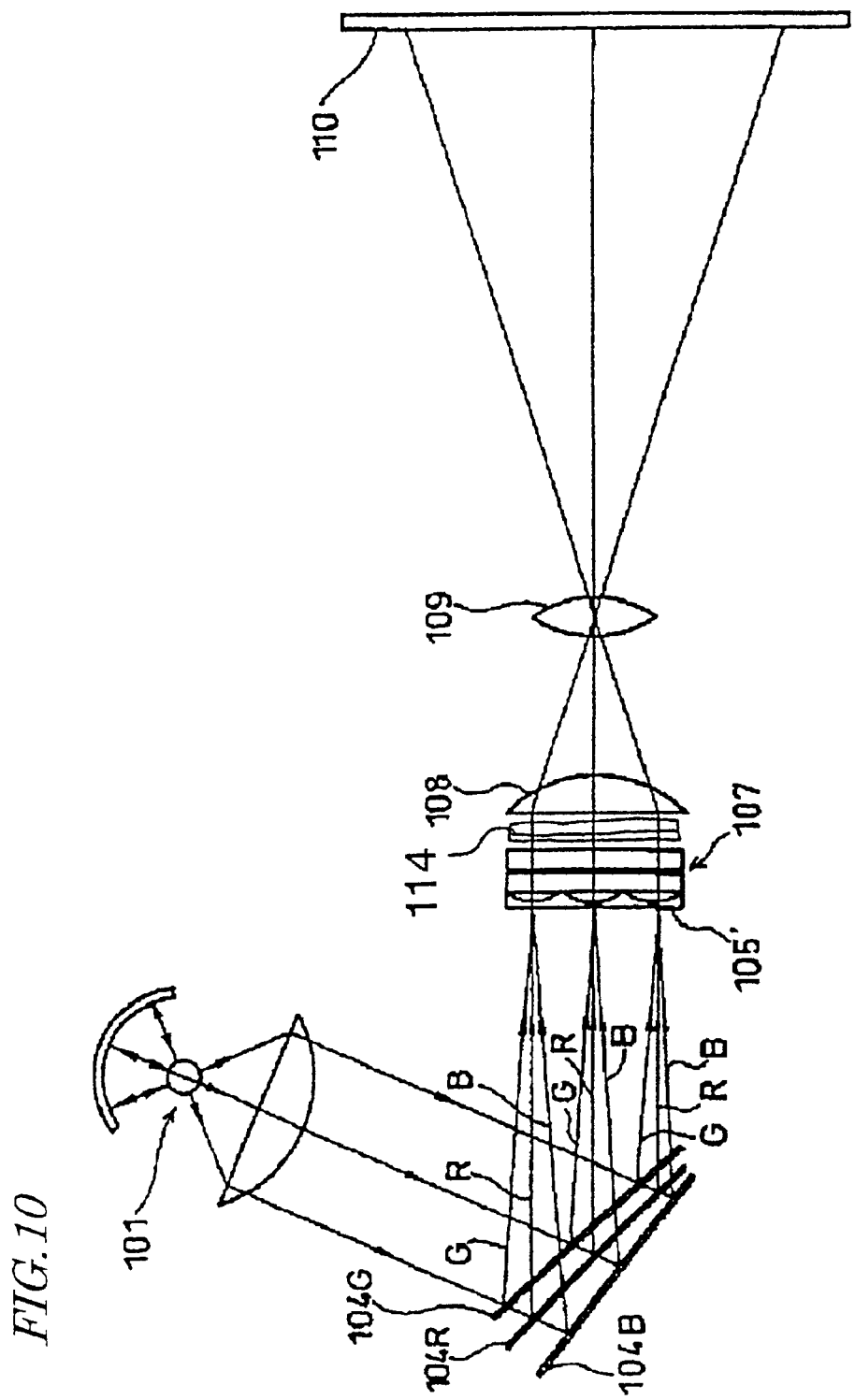
FIG. 10 schematically illustrates an arrangement for a projection type color image display device according to a second specific preferred embodiment of the present invention.

Unlike the image display device of the first preferred embodiment, the projection type color liquid crystal display device of this second preferred embodiment includes an optical shifter 114 between the liquid crystal display panel 107 and the projection lens 109 as shown in FIG. 10.

Figure 11A:
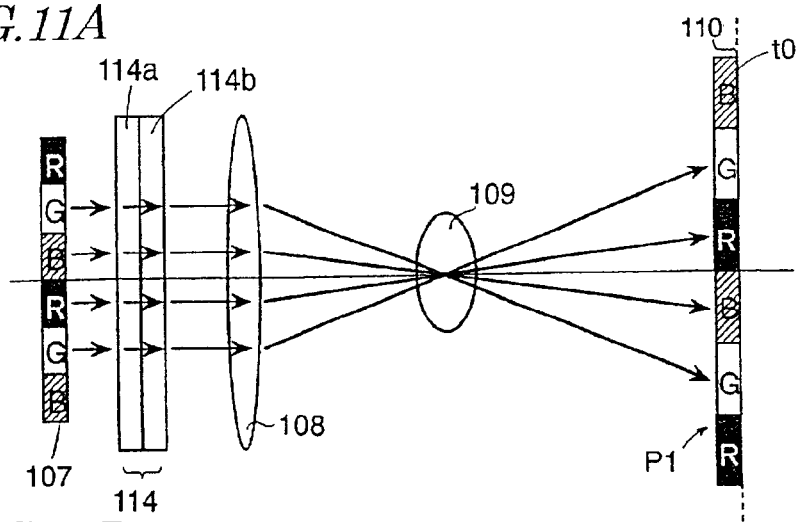
FIGS. 11A, 11B and 11C illustrate how the display device shown in FIG. 10 displays images.
Figure 11B:
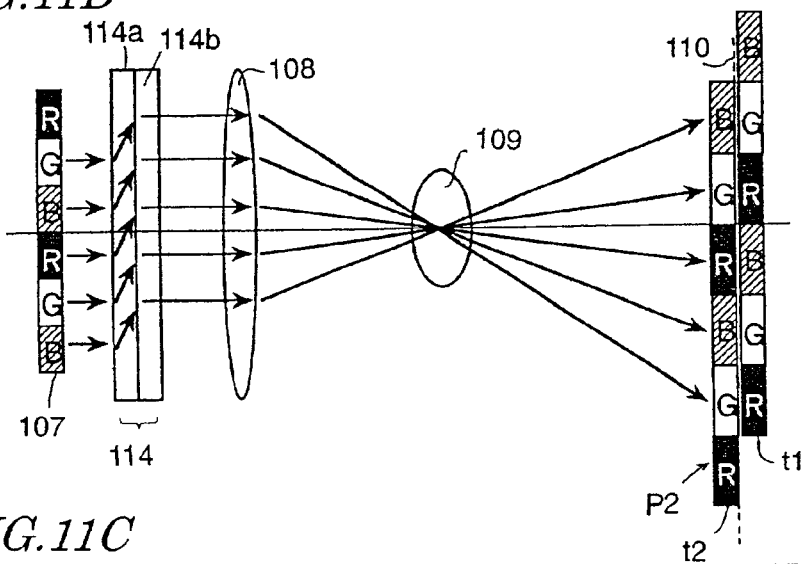
Figure 11C:
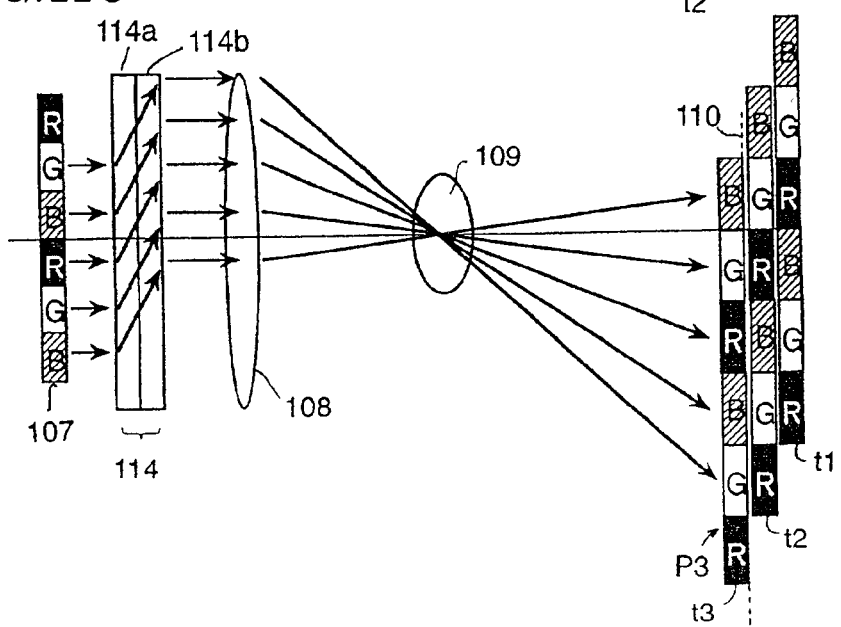

The optical shifter 114 is made up of first and second elements 114a and 114b as shown in FIGS. 11A to 11C. In response to electric signals, these elements 114a and 114b are controlled in such a manner as to shift a light beam, directed from the liquid crystal display panel 107 toward the projection lens 109, either vertically or horizontally by one pixel pitch on the screen 110 (i.e., a plane coming out of the paper of FIG. 10).

For example, at a time t1, the optical shifter 114 is controlled to have a shift level of zero as shown in FIG. 11A. At this point in time, the liquid crystal display panel 107 is controlled to a state corresponding to subframe No. 1 and a projected image P1 is displayed on the screen 110.

Next, at a time t2, the liquid crystal display panel 107 is controlled to a state corresponding to subframe No. 2, while the optical shifter 114 is controlled to have a shift level of one (i.e., the image on the screen 110 is shifted by one pixel pitch) by moving its elements 114a and 114b as shown in FIG. 11B. As a result, a projected image P2 is formed on the screen 110. At this time t2, an image portion representing a G pixel of the image P2 is projected onto a position on the screen 110 at which an image portion representing an R pixel of the image P1 was projected at the time t1; an image portion representing a B pixel of the image P2 is projected onto a position on the screen 110 at which an image portion representing a G pixel of the image P1 was projected at the time t1; and an image portion representing an R pixel of the image P2 is projected onto a position on the screen 110 at which an image portion representing a B pixel of the image P1 was projected at the time t1. That is to say, as for the same light beam that has passed through a predetermined pixel region, its focal point on the screen 110 at the time t2 is different from its focal point on the screen 110 at the time t1.

Thereafter, at a time t3, the liquid crystal display panel 107 is controlled to a state corresponding to subframe No. 3, while the optical shifter 114 is controlled to have a shift level of two (i.e., the image on the screen 110 is shifted by two pixel pitches) by moving its elements 114a and 114b as shown in FIG. 11C. As a result, a projected image P3 is formed on the screen 110. At this time t3, an image portion representing a B pixel of the image P3 is projected onto the R pixel position on the screen 110 at the time t1; an image portion representing an R pixel of the image P3 is projected onto the G pixel position on the screen 110 at the time t1; and an image portion representing a G pixel of the image P3 is projected onto the B pixel position on the screen 110 at the time t1.

By displaying the three images P1, P2 and P3 corresponding to the three subframes Nos. 1, 2 and 3 from the time t1 to the time t3 in this manner, three image portions representing R, G and B pixels of the images P1, P2 and P3 are displayed one after another at every pixel position on the screen 110. If the subframes to be displayed are changed (i.e., if the shift rate is set equal to) two or three times as fast as the image frame rate of the video signal source, then the image projected will look like an image of an XGA-grade resolution to the human eyes. An image of such a grade is normally formed by a three-panel type display device that can display each and every pixel in the three primary colors of R, G and B, though. That is to say, even though the image display device of this preferred embodiment is of a single-panel type, this display device can display a full-color projected image as well as a display device of a three-panel type. Thus, compared to the three-panel type, the display device of this preferred embodiment can cut down the costs significantly.

Embodiment 3

Figure 12:
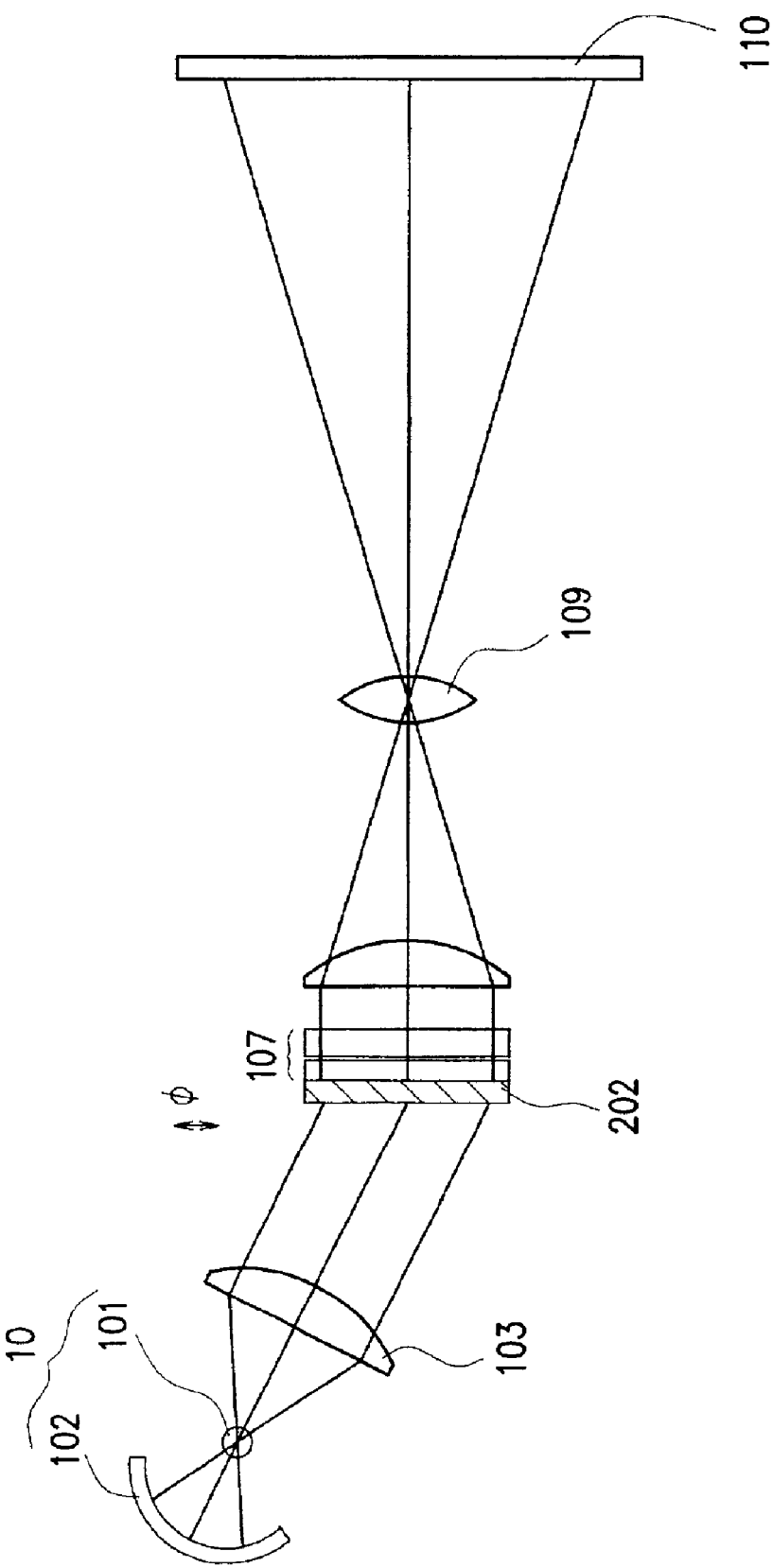
FIG. 12 schematically illustrates an arrangement for a projection type color image display device according to a third specific preferred embodiment of the present invention.
Figure 13A:
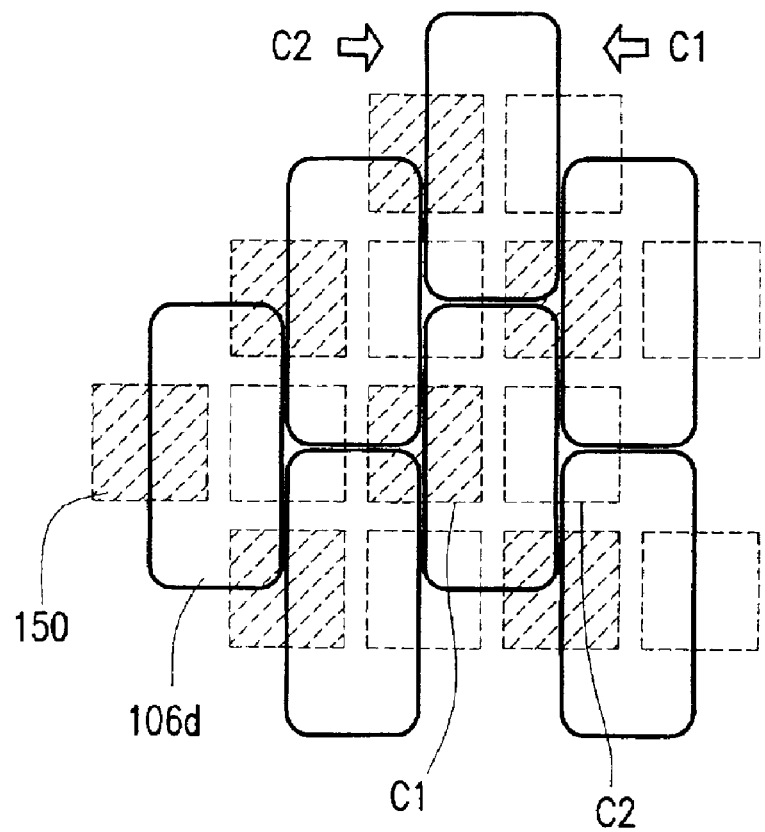
FIG. 13A illustrates a positional relationship between microlenses and pixel regions in an image display device according to an alternative preferred embodiment of the present invention.
Figure 13B:
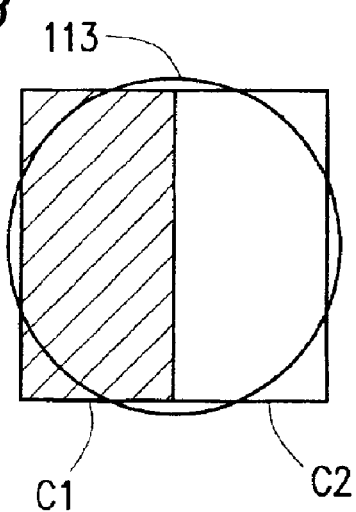
FIG. 13B illustrates how respective light beams are distributed in the entrance pupil of a projection lens in the display device of the alternative preferred embodiment.
Figure 14:
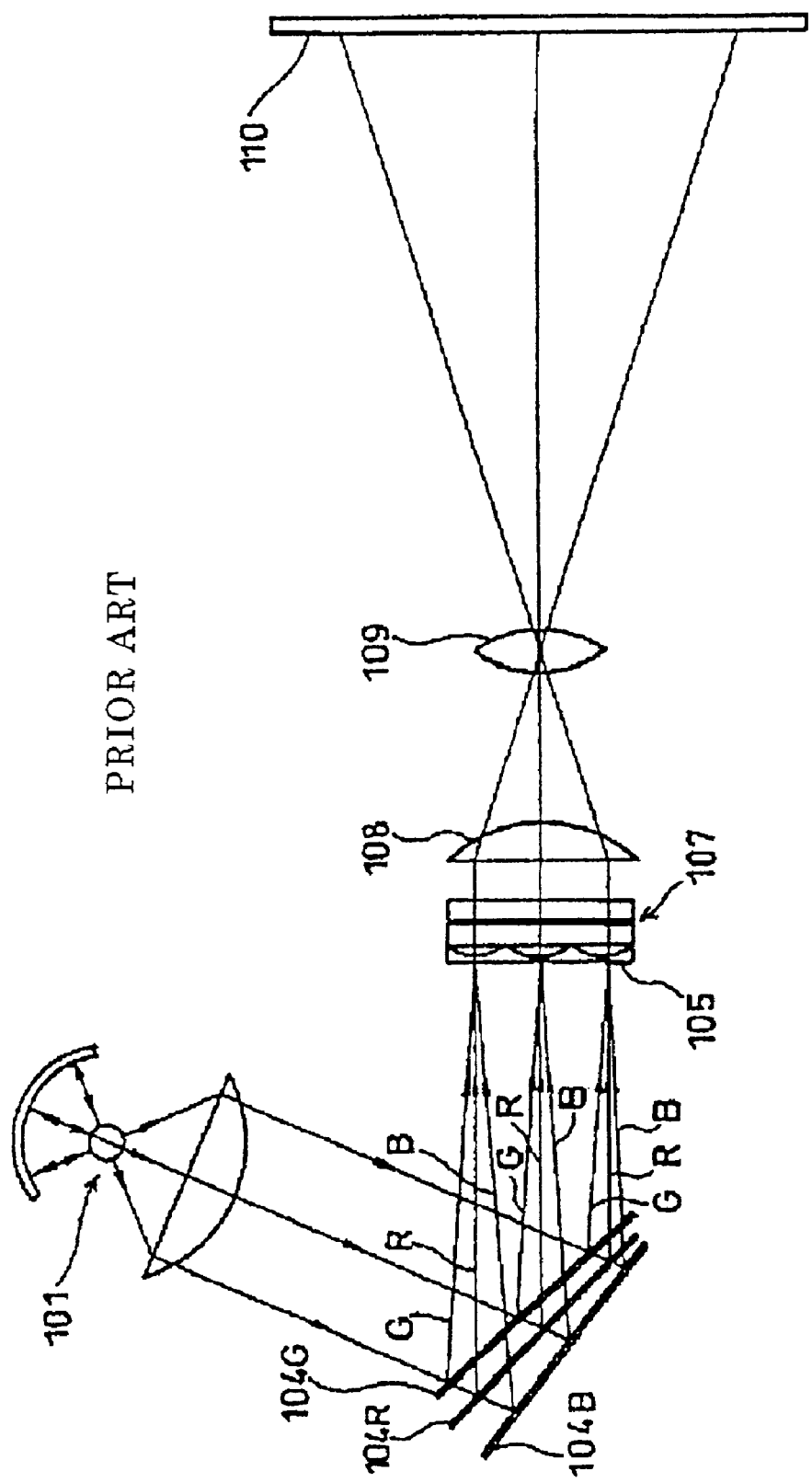
FIG. 14 schematically illustrates an arrangement for a conventional projection type color image display device.
Figure 15:
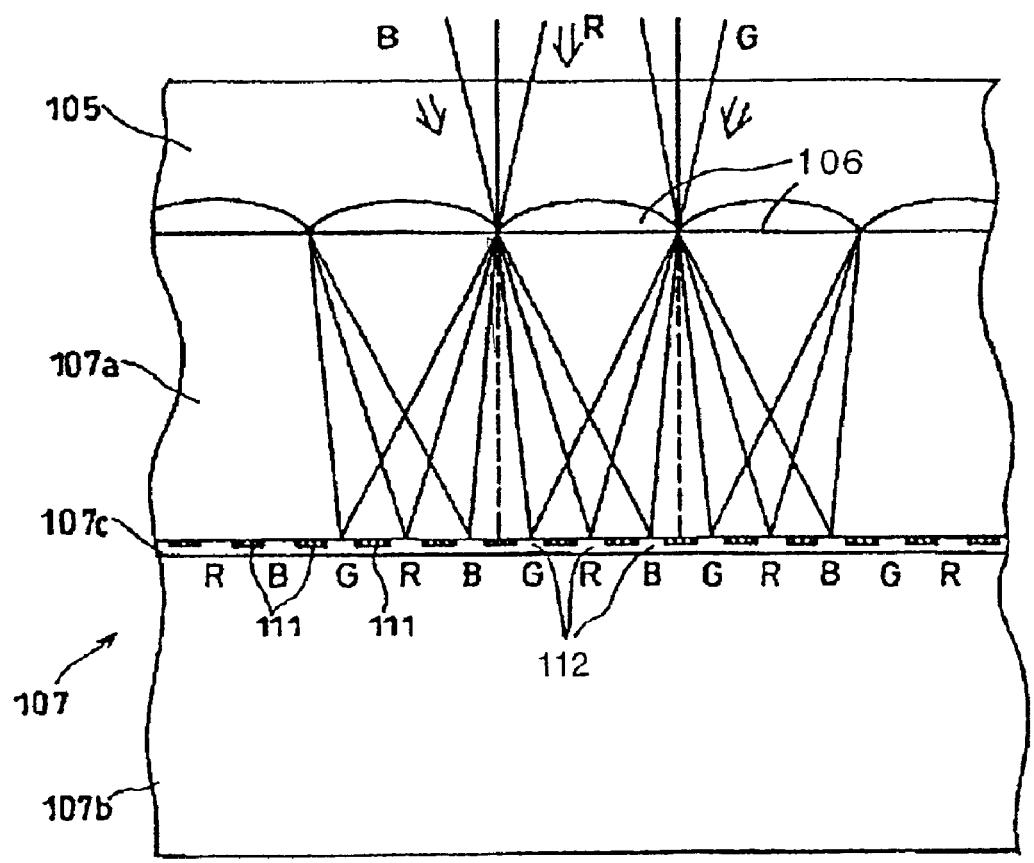
FIG. 15 is a cross-sectional view illustrating how respective light beams are converged around a liquid crystal display panel provided for the display device shown in FIG. 14.
Figure 16:
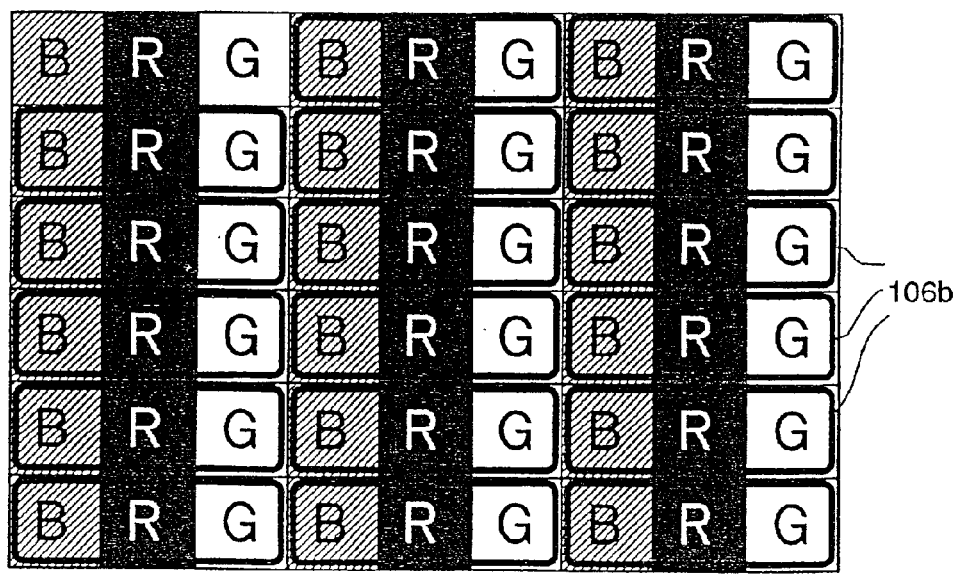
FIG. 16 is a plan view illustrating a positional relationship between the microlenses and the pixels of the liquid crystal display panel in the display device shown in FIG. 14.

Hereinafter, an image display device according to a third specific preferred embodiment of the present invention will be described with reference to FIGS. 12, 13A and 13B. In FIGS. 12, 13A and 13B, each member having substantially the same function as the counterpart of the first preferred embodiment will be identified by the same reference numeral for convenience sake and the description thereof will be omitted herein.

Figure 2:
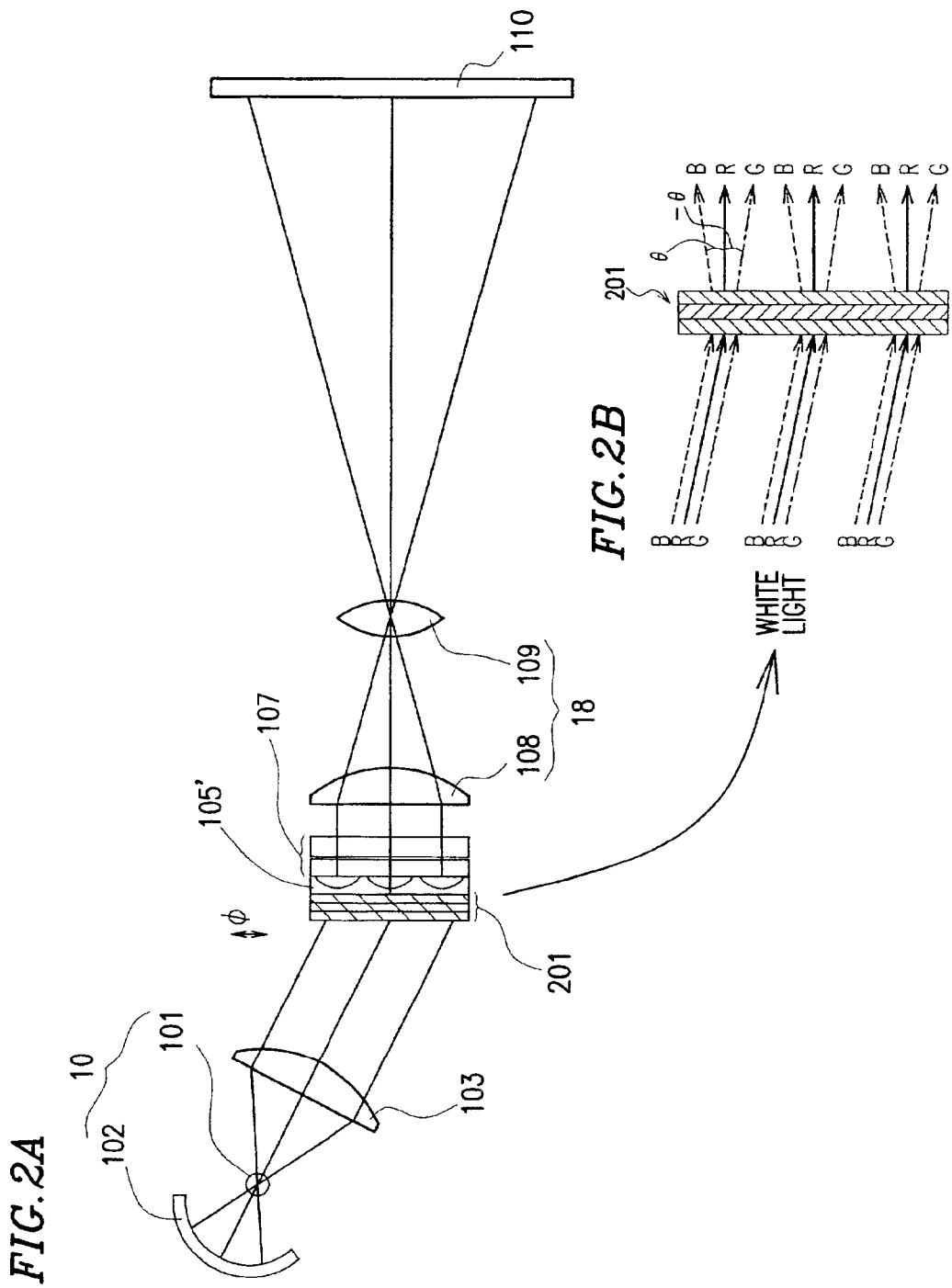
FIGS. 2A and 2B schematically illustrate an arrangement for a modified example of the display device shown in FIG. 1.

Unlike the image display device of the first preferred embodiment, the projection type color image display device of this third preferred embodiment includes an array of hologram elements in place of the microlens array. Comparing this preferred embodiment with the first preferred embodiment shown in FIG. 1 or 2, it can be seen that the display device of the third preferred embodiment shown in FIG. 12 does not include the microlens array 105' shown in FIG. 1 but includes an array 202 of hologram elements that has a different function from that of the planar hologram element 201 having the color separating function as shown in FIG. 2. This hologram element array 202 is provided on one surface of the liquid crystal display panel 107 on which the incoming white light is incident.

This hologram element array 202 not only diffracts and separates the white light, emitted from the light source section 10, into light beams in respective colors but also converges those light beams onto associated ones of the R, G and B pixels of the liquid crystal display panel 107. That is to say, the hologram element array 202 can perform both the color separating function of the planar hologram element 201 and the condensing function of the microlens array 105' at the same time.

In the planar hologram element 201, the R, G and B light beams have respectively constant diffraction angles on its plane. On the other hand, the hologram element array 202 includes a plurality of hologram elements, each performing a predetermined optical function and changing the diffraction angle of an incoming light beam in accordance with its point of incidence on the element. More specifically, each hologram element changes the diffraction angles of the incoming light beams so that the diffraction angle is relatively small around the center of the element but gradually increases toward the periphery thereof. Thus, each hologram element can perform the condensing function. Furthermore, just like the planar hologram element 201, each hologram element can also separate the incoming white light into light beams in respective colors.

As used herein, the "hologram elements" refer to a plurality of portions (or regions) of the hologram element array that can perform the condensing function. These hologram elements are defined on a single plane. The shape of each of these hologram elements corresponds to that of one of these portions (or regions). That is to say, the shape of each hologram element array region having the condensing function is herein referred to as "the shape of each hologram element". The hologram element array 202 may be made by the method disclosed in Japanese Laid-Open Publication No. 8-190092, for example.

Like each of the microlenses 106c included in the microlens array 105' of the first preferred embodiment, each hologram element also has a rectangular shape that is elongated perpendicularly to the direction in which the R, G and B pixels, destinations of the incoming light, are arranged. That is to say, the shape and arrangement of the hologram elements are similar to those of the microlenses 106c shown in FIG. 3. After passing through the liquid crystal display panel 107 by way of these hologram elements, the R, G and B light beams will also follow the same paths as in the first preferred embodiment. According to this third preferred embodiment, the pupil plane of the projection lens 109 can also be used almost entirely. As a result, a bright image can also be projected onto the screen.

Optionally, the image display device of this third preferred embodiment may also further include the optical shifter 114 on the light outgoing plane of the liquid crystal display panel 107 as in the second preferred embodiment. Then, an image display device that can display a bright image at an increased resolution is provided.

In the first through third preferred embodiments of the present invention described above, the R light beam is supposed to be incident vertically onto the panel plane. Alternatively, the G or B light beam may also be incident vertically onto the panel plane and each of the other two light beams may be incident thereon so as to form an angle of ±θ degrees with the G or B light beam. In that case, the positional relationship between the microlenses and the pixels may be modified appropriately such that a light beam representing one of the three primary colors will be converged onto its associated pixel in the same color.

It should also be noted that the display device of the present invention is not limited to those preferred embodiments in which an image is displayed using light beams representing the three primary colors. Speaking more generically, the present invention may be embodied as any of various types of display devices for displaying an image by modulating a plurality of light beams having respective wavelengths that fall within mutually different parts of the visible radiation range. For example, suppose light beams C1 and C2 in two different colors are used as shown in FIG. 13A. In that case, pixel regions 150 and optical elements (e.g., microlenses) 106d may be arranged as shown in FIG. 13A and the light beams C1 and C2 may be incident onto the elements 106d so as to have mutually different incident angles in the azimuth corresponding to the shorter-side direction of the optical elements 106d. Then, the light beams C1 and C2 in vertically elongated shape, corresponding to that of the lenses 106d, will enter the entrance pupil 113 of the projection lens 109 as shown in FIG. 13B. Thus, the entire entrance pupil 113 can be used efficiently and a brighter image can be projected onto the screen as a result. It should be noted that each optical element 106d preferably has a size approximately equal to the pixel pitch in the shorter-side direction thereof and has a size twice or more as long as the pixel pitch in the longer-side direction thereof that is perpendicular to the shorter-side direction.

In the preferred embodiments described above, a so-called "transmission type" display element (i.e., the liquid crystal display panel 107), from which a modulated light beam goes out through one of its planes that is opposite to the light incident plane thereof, is supposed to be used. Alternatively, a "reflection type" display element for reflecting an incoming light beam back to the direction from which it comes may also be used.

As described above, a projection type color image display device according to the present invention can display a brightly projected image by using the projection lens efficiently even though this device is of a single-panel type. Thus, the display device of the present invention can be used effectively as a projection type color image display device for a projection type color liquid crystal TV system or information display system of a small size.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A projection type display device comprising:
    a light source for emitting light including a plurality of light components falling within mutually different wavelength ranges;
    a plurality of pixels for modulating the light independent of each other;
    a first optical system, which receives the light that has been emitted from the light source and directs the light toward the pixels;
    a second optical system, which projects the light that has been modulated by the pixels onto a projection plane,
    wherein the first optical system includes at least one optical element for converging the light components onto mutually different ones of the pixels in accordance with their wavelength ranges, the mutually different ones of the pixels being arranged in a predetermined azimuth on a panel plane on which the pixels are defined,
    wherein the optical element is elongated in shape and has first and second lengths as measured in first and second directions that are defined in a common plane, respectively, the first direction being substantially parallel to the predetermined azimuth, the second direction being substantially perpendicular to the first direction, the second length being greater than the first length so that the optical element is elongated in shape,
    wherein the optical element converges the light components both in the first and second directions;
    wherein the optical element is a microlens;
    wherein the light comprises first, second and third different colored wavelengths, the first colored wavelength impinging upon the microlens at an angle normal to the common plane and the second and third different colored wavelengths impinging upon the optical element at angles inclined from the normal so that the first, second and third different colored wavelengths impinge upon the microlens at different angles; and
    wherein the microlens converges light of the first wavelength onto a pixel that is overlapped by the microlens, and the microlens directs light of the second and third wavelengths onto respective other pixels that are not overlapped by the microlens.

2. The device of claim 1, wherein the first optical system further comprises a color separator for separating the light that has been emitted from the light source into a plurality of light beams falling within the mutually different wavelength ranges, and
    wherein the light beams are incident onto the optical element at mutually different angles in the predetermined azimuth.

3. The device of claim 2, wherein the optical element is a lens for converging the light beams, which have been incident thereon at the mutually different angles, onto the mutually different ones of the pixels.

4. The device of claim 3, wherein the lens is made by performing the steps of:
    forming a resist film on a substrate; and
    exposing the resist film to radiation that has its intensity changed in accordance with an intended shape of the lens.

5. The device of claim 1, wherein the optical element separates the light that has been emitted from the light source into a plurality of light beams falling within the mutually different wavelength ranges in the predetermined azimuth.

6. The device of claim 5, wherein the optical element is a hologram element.

7. The device of claim 1, wherein the second length is twice or more as long as a pitch at which the pixels are arranged in the second direction.

8. The device of claim 1, wherein the optical element converges light beams representing three different colors onto associated three of the pixels, respectively.

9. The device of claim 8, wherein the first length is approximately as long as a pitch at which the pixels are arranged in the first direction, and
    wherein the second length is approximately three times as long as a pitch at which the pixels are arranged in the second direction.

10. The device of claim 8, wherein the optical element converges the light beams representing the three different colors onto the three pixels that are adjacent to each other in the first direction.

11. The device of claim 1, wherein the first optical system further comprises at least second and third optical elements, which are adjacent to the at least one optical element in the first and second directions, respectively, and
    wherein the at least one optical element and the second optical element are shifted from each other in the second direction.

12. The device of claim 11, wherein the shift of the second optical element from the at least one optical element in the second direction is integral times as long as the pitch at which the pixels are arranged in the second direction.

13. The device of claim 11, wherein the at least one optical element and the third optical element are aligned with each other in the first direction.

14. The device of claim 1, wherein each said pixel is defined in a display panel including a liquid crystal layer.

15. The device of claim 1, wherein the second optical system comprises an image shifter for shifting the image formed on the projection plane by projecting the light, which has been passed through the pixels, at mutually different positions on the projection plane with time.

16. The projection type display device of claim 1, wherein the plurality of pixels are provided in a display panel, and wherein a plurality of adjacent red pixels are arranged adjacent one another in a diagonal line extending across at least part of the display pane.

17. The projection type display device of claim 16, wherein a plurality of adjacent green pixels are arranged adjacent one another in another diagonal line extending across at least part of the display pane, wherein the line of red pixels and the another line of green pixels are substantially parallel to one another.

18. The projection type display device of claim 1, wherein the optical element is a microlens.

19. A projection type display device comprising:
   a light source for emitting light including a plurality of light components falling within mutually different wavelength ranges;
   a plurality of pixels in a display panel for modulating the light independent of each other;
   a first optical system, which receives the light that has been emitted from the light source and directs the light toward the pixels of the display panel; and
   a second optical system, which projects the light that has been modulated by the pixels onto a projection plane and/or screen, wherein the first optical system includes a plurality of microlenses, at least one of the microlenses converging the light components onto mutually different ones of the pixels in accordance with their wavelength ranges, the mutually different ones of the pixels being arranged in a predetermined azimuth on a panel plane on which the pixels are defined, and wherein the light comprises first, second and third different colored wavelengths, the first colored wavelength impinging upon the microlens at an angle normal to a plane of the microlens and the second and third different colored wavelengths impinging upon the optical element at angles inclined from the normal so that the first, second and third different colored wavelengths impinge upon the microlens at different angles; and wherein the microlens converges light of the first wavelength onto a pixel which is overlapped by the microlens, and the microlens directs light of the second and third wavelengths onto respective other pixels that are not overlapped by the microlens.

* * * * *